US012438872B2

(12) United States Patent
Pinski et al.

(10) Patent No.: US 12,438,872 B2
(45) Date of Patent: Oct. 7, 2025

(54) ROLE-BASED PERMISSION DELEGATION IN A PROVIDER NETWORK

(71) Applicant: Amazon Technologies, Inc., Seattle, WA (US)

(72) Inventors: Nikita Pinski, Vancouver (CA); Jerry Connolly, Seattle, WA (US); Dennis Tighe, Seattle, WA (US); Christopher Richard Jacques De Kadt, Seattle, WA (US); Rebecca Claire Weiss, Vienna, VA (US); Brad E Marshall, Bainbridge Island, WA (US); Akhilesh Mritunjai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 17/994,656

(22) Filed: Nov. 28, 2022

(65) Prior Publication Data
US 2024/0179146 A1    May 30, 2024

(51) Int. Cl.
*H04L 9/40*    (2022.01)

(52) U.S. Cl.
CPC ......... *H04L 63/0838* (2013.01); *H04L 63/20* (2013.01)

(58) Field of Classification Search
CPC ... H04L 63/0838; H04L 63/20; H04L 63/105; H04L 63/102; H04L 63/108; H04L 63/08;
(Continued)

(56) References Cited

U.S. PATENT DOCUMENTS 5,535,276 A * 7/1996 Ganesan ............... H04L 9/0825
380/46
8,635,671 B2 * 1/2014 Wood ..................... H04L 63/08
713/168
(Continued)

FOREIGN PATENT DOCUMENTS

WO    2022/125760 A1    6/2022

OTHER PUBLICATIONS

AWS, "AWS Identity and Access Management—User Guide", Available Online: <https://web.archive.org/web/20220120055317/https://docs.aws.amazon.com/IAM/latest/UserGuide/iam-ug.pdf>, Jan. 19, 2022, 883 pages.
(Continued)

*Primary Examiner* — David Garcia Cervetti
(74) *Attorney, Agent, or Firm* — Nicholson De Vos Webster & Elliott LLP

(57) ABSTRACT

Techniques for role-based permission delegation in a provider network. The techniques include an assuming service in the provider network sending a request to a temporary credential service in the provider network to assume a delegation role. The assuming service, acting in the delegation role, sending a request to the temporary credential service to assume the customer role in accordance with a down scoping policy. The assuming service, acting in the customer role, performing an action in a strict subset of actions on a customer resource. The techniques improve the operation of the provider network by allowing a permission to perform an action on the customer resource that is granted by the customer to a delegating service in the provider network to be delegated to the assuming service while complying with the access control principle of least privilege.

20 Claims, 9 Drawing Sheets

(58) Field of Classification Search
CPC ............... H04L 63/0807; H04L 63/068; H04L 63/0846; H04L 63/10; G06F 21/6218
See application file for complete search history.

(56) References Cited

U.S. PATENT DOCUMENTS

| | | | | |
|---|---|---|---|---|
| 8,769,642 | B1* | 7/2014 | O'Neill | H04L 63/0807 726/28 |
| 8,955,149 | B1* | 2/2015 | Baer | G06F 21/6218 726/28 |
| 8,966,570 | B1* | 2/2015 | Roth | G06F 21/62 726/28 |
| 9,098,675 | B1* | 8/2015 | Roth | H04L 63/0884 |
| 9,418,213 | B1* | 8/2016 | Roth | H04L 63/08 |
| 9,894,067 | B1* | 2/2018 | Mandadi | H04L 63/20 |
| 9,900,160 | B1* | 2/2018 | Barbour | H04L 63/126 |
| 10,250,612 | B1* | 4/2019 | Raposa | H04L 63/108 |
| 10,382,449 | B2* | 8/2019 | Brandwine | H04L 63/108 |
| 10,666,657 | B1* | 5/2020 | Threlkeld | H04L 9/0643 |
| 10,880,283 | B1* | 12/2020 | Roth | G06F 21/604 |
| 10,944,561 | B1* | 3/2021 | Cahill | H04L 9/3213 |
| 11,381,563 | B1* | 7/2022 | Gafa | H04W 12/64 |
| 11,599,642 | B2* | 3/2023 | Young | H04L 63/0823 |
| 11,810,062 | B2* | 11/2023 | Young | G06F 21/57 |
| 11,843,601 | B2* | 12/2023 | Streete | H04L 63/0876 |
| 12,210,659 | B2* | 1/2025 | Ramaiah | G06F 9/4416 |
| 12,229,241 | B2* | 2/2025 | Young | H04L 9/3268 |
| 2002/0083014 | A1* | 6/2002 | Brickell | G06Q 30/02 705/76 |
| 2005/0144230 | A1* | 6/2005 | Russo | G06F 21/604 709/204 |
| 2005/0257245 | A1* | 11/2005 | Patrick | H04L 63/0263 726/1 |
| 2006/0004662 | A1* | 1/2006 | Nadalin | H04L 63/0823 705/50 |
| 2008/0244687 | A1* | 10/2008 | McClain | H04L 63/10 726/1 |
| 2008/0282354 | A1* | 11/2008 | Wobber | G06F 21/6218 726/26 |
| 2008/0307505 | A1* | 12/2008 | Persaud-Deolall | G06F 21/6281 726/4 |
| 2009/0300711 | A1* | 12/2009 | Tokutani | G06F 21/6218 726/1 |
| 2010/0154040 | A1* | 6/2010 | Chiu | H04L 63/0823 726/5 |
| 2010/0306817 | A1* | 12/2010 | Grebenik | G06F 21/604 726/1 |
| 2012/0060207 | A1* | 3/2012 | Mardikar | H04L 63/20 726/4 |
| 2012/0331286 | A1* | 12/2012 | Choi | H04W 12/084 713/156 |
| 2013/0174223 | A1* | 7/2013 | Dykeman | G06F 21/10 726/4 |
| 2014/0020051 | A1* | 1/2014 | Lu | G06F 21/6218 726/4 |
| 2014/0365781 | A1* | 12/2014 | Dmitrienko | G06F 21/335 713/185 |
| 2015/0007283 | A1* | 1/2015 | Brugger | H04L 63/0407 726/5 |
| 2015/0128237 | A1* | 5/2015 | Lund | H04L 9/32 726/7 |
| 2015/0128242 | A1* | 5/2015 | Hoy | H04L 63/0884 726/9 |
| 2015/0150106 | A1* | 5/2015 | Lund | H04L 63/083 726/7 |
| 2015/0244708 | A1* | 8/2015 | Ballard | H04L 63/0823 726/6 |
| 2016/0092802 | A1* | 3/2016 | Theebaprakasam | G06Q 10/0631 705/7.12 |
| 2016/0112429 | A1* | 4/2016 | Sundaresan | H04L 63/08 726/4 |
| 2016/0142399 | A1* | 5/2016 | Pace | G06F 21/41 726/4 |
| 2016/0261658 | A1* | 9/2016 | Taylor | H04L 65/612 |
| 2016/0277411 | A1* | 9/2016 | Dani | G06F 21/6218 |
| 2017/0244695 | A1* | 8/2017 | Lund | H04L 63/083 |
| 2017/0318400 | A1* | 11/2017 | Westermann | H04R 25/70 |
| 2019/0095646 | A1* | 3/2019 | Goodridge | G06F 21/6281 |
| 2019/0182262 | A1* | 6/2019 | Raposa | H04L 63/108 |
| 2019/0332790 | A1* | 10/2019 | Kukehalli Subramanya | G06F 21/33 |
| 2020/0162461 | A1* | 5/2020 | Blankinship | H04L 51/42 |
| 2020/0358777 | A1* | 11/2020 | Threlkeld | H04L 9/0643 |
| 2020/0366685 | A1* | 11/2020 | Ullrich | G16H 40/40 |
| 2021/0124633 | A1* | 4/2021 | Cseri | G06F 16/2448 |
| 2021/0248556 | A1* | 8/2021 | Venkatraman | G06Q 10/103 |
| 2021/0281428 | A1* | 9/2021 | Kempf | G06F 21/64 |
| 2022/0109677 | A1* | 4/2022 | Bajaria | H04L 63/105 |
| 2022/0150250 | A1* | 5/2022 | Chi | H04L 63/0884 |
| 2022/0200990 | A1* | 6/2022 | Madej | H04L 63/0807 |
| 2022/0350794 | A1* | 11/2022 | Chintala | H04L 63/0281 |
| 2024/0155003 | A1* | 5/2024 | Gulati | H04L 63/083 |

OTHER PUBLICATIONS

International Search Report and Written Opinion, PCT App. No. PCT/US2023/080697, Feb. 16, 2024, 12 pages.
International Preliminary Report on Patentability, PCT App. No. PCT/US2023/080697, Jun. 5, 2025, 9 pages.

* cited by examiner

```
00: {
01:   "Effect": "Allow",
02:   "Action": [
03:     "AssumeRole",
04:     "TagSession"
05:   ],
06:   "Resource": "*",
07:   "Condition": {
08:     "RnLike": {
09:       "ResourceRn": "${PrincipalTag/AssumableCustomerRoleRn}"
10:     },
11:     "ForAllValues:StringNotLike": {
12:       "ResourceServiceName": ["evtbussvc.examplepn.com", ...]
13:       "ResourceAccount": ["333344445555", ...]
14:     },
15:     "ForAnyValue:RnEquals": {
16:       "ScopingPolicyArns": "rn:examplepn:iamsvc::333344445555:policy/PollQueueOnly"
17:     }
18:   }
19: }
```

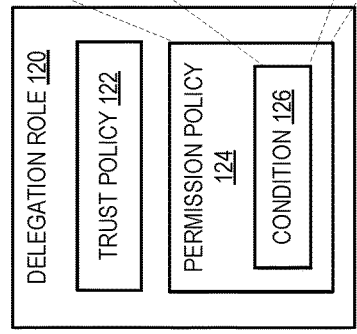

FIG. 4

ROLE-BASED PERMISSION DELEGATION IN A PROVIDER NETWORK

TECHNICAL FIELD

The present disclosure relates generally to a system and a method for managing identities and access to services and resources in a provider network. More particularly, it relates to a system and a method for role-based permission delegation in a provider network.

BACKGROUND

Due to the developments in computer technology and its increasing popularity, many people, companies, organizations, and other users are increasingly using on-demand cloud computing platforms (equivalently "provider networks") to build and host their computing applications and workloads. For example, public and private internet web applications are frequently built and hosted using provider network infrastructure. Currently, a popular provider network encompasses millions of servers around the world supporting hundreds of products and services that are used by users to build and deploy their computing applications and workloads.

The services offered to users by a provider network are varied. For example, the services offered by one popular provider network include virtualization services (equivalently "elastic computing services"), relational database services, data storage services, on-demand code execution services (equivalently "serverless code execution services"), content delivery network (CDN) services, machine-learning services, among other services. From the perspective of the provider network, users of the provider network are sometimes referred to as "customers."

Since a provider network supports multiple customers on the same or shared infrastructure, identity and access management (IAM) is essential. IAM uses centrally managed fine-grained permissions to control who or what can access services and resources in the provider network. IAM in provider networks typically operates under the principle of least privilege. Under this principle, an accessing entity should be granted only those permissions that are necessary to perform its intended function and no more (no greater) permission. Under this principle, a service in a provider network is by default granted no permission or granted only very limited permission to access a resource in the provider network provisioned to a customer. The customer must typically grant permission to the service to access the resource before the service can perform useful actions on the resource on behalf of the customer.

BRIEF DESCRIPTION OF DRAWINGS

Various examples in accordance with the present disclosure will be described with reference to the drawings, in which:

FIG. 4 illustrates an example of a permission policy of a delegation role.

Figure 1:
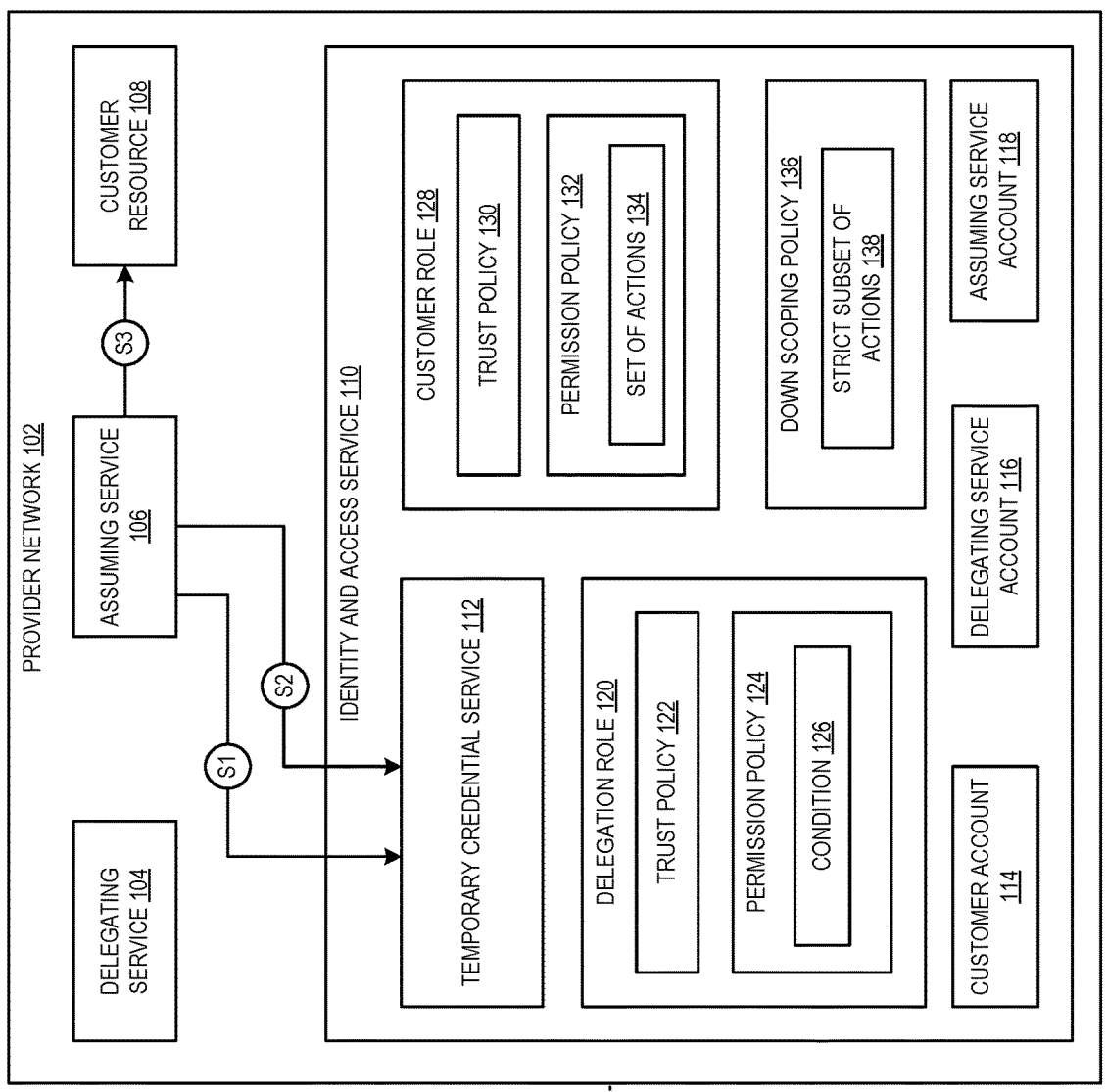
FIG. 1 illustrates an example of a system for role-based permission delegation in a provider network.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The following description is not intended to limit the invention to the examples described, but rather to enable any skilled person in the art to make and use this invention.

1. Overview

Various aspects of the present disclosure provide a system and a method for role-based permission delegation in a provider network.

As shown in FIG. 1, one aspect provides a system 100 for role-based permission delegation in a provider network 102. The system 100 includes the provider network 102 and optionally includes an intermediate network 148 and a remote electronic device 140. The provider network 102 includes a delegating service 104, an assuming service 106, a resource 108 provisioned to a customer (equivalently "customer resource 108"), and an identity and access service 110 (equivalently "IAM service 110"). The IAM service 110 includes a customer account, a delegating service account 116, an assuming service account 118, a delegation role 120, a customer role 128, and a down scoping policy 136. The delegation role 120 encompasses a trust policy 122 and a permission policy 124. The customer role 128 also encompasses its own trust policy 130 and permission policy 132. The permission policy 132 of the customer role 128 allows a set of actions 134 to be performed on the customer resource 108. The permission policy 124 of the delegation role 120 specifies a condition 126 on assuming the customer role 128. The condition 126 on assuming the customer role 128 requires adherence to the down scoping policy 136. The down scoping policy 136 limits the actions that are allowed to be performed on the customer resource 108 to a strict subset 138 of the set of actions 134 allowed by the permission policy 132 of the customer role 128. The optional remote electronic device 140 includes one or more of a command line interface (CLI) 142, a graphical user interface (GUI) 144, or a software development kit (SDK) 146.

Additionally, the system 100 and any component thereof depicted in FIG. 1 can include any other suitable component.

As shown in FIG. 1 with circles labeled S1, S2, and S3, one aspect provides a method for role-based permission delegation in the provider network 102. The method includes at step S1 the assuming service 106 sending a request to the temporary credential service 112 to assume the delegation role 120. The method further includes at step S2 the assuming service 106, acting in the delegation role 120, sending a request to the temporary credential service 112 to assume the customer role 114 in accordance with the down scoping policy 136. The method further includes at step S3 the assuming service 106, acting in the customer role 114, performing an action in the strict subset of actions 138 on the customer resource 108.

The method can be performed in system 100 or in any other suitable system.

The system and method improve the operation of the provider network 102 by allowing a permission to perform an action on the customer resource 108 that is granted by the customer to the delegating service 104 to be delegated to the assuming service 106 where the assuming service 106 can perform the action more efficiently (e.g., with lower latency, with greater throughput, using fewer CPU or GPU clock cycles, or using less data storage device space), can perform the action with lower administrative or organizational cost (e.g., by reducing or avoiding software development costs), or can perform the action with greater security (e.g., by avoiding sharing of authentication credentials or encryption keys). This delegation can be accomplished while adhering to the principle of least privilege. In particular, the system and method provide the benefit of improved operation of the provider network 102 by providing a mechanism that allows delegation to the assuming service 106 of permission to perform the strict subset of actions 138 on the customer resource 108 without the assuming service 106 acquiring permission to perform all actions in the set of actions 134 on the customer resource 108, thereby adhering to the principle of least privilege. Because the system and method can be used to ensure that the assuming service 106 receive permission to perform only the actions needed to carry out the task delegated to it, the system and method improve the operation of the provider network by reducing or eliminating accidental or intentional performance of actions by the assuming service 106 that the assuming service 106 does not need to perform to carry out the delegated task.

Additional aspects, applications, and advantages will become apparent in view of the following description and associated figures.

2. System

As shown in FIG. 1, one aspect provides a system 100 for role-based permission delegation in a provider network 102. The system 100 includes the provider network 102 and optionally includes an intermediate network 148 and a remote electronic device 140. The provider network 102 includes a delegating service 104, an assuming service 106, a resource 108 provisioned to a customer (equivalently "customer resource 108"), and an identity and access service 110 (equivalently "IAM service 110"). The IAM service 110 includes a customer account, a delegating service account 116, an assuming service account 118, a delegation role 120, a customer role 128, and a down scoping policy 136. The delegation role 120 encompasses a trust policy 122 and a permission policy 124. The customer role 128 also encompasses its own trust policy 130 and permission policy 132. The permission policy 132 of the customer role 128 allows a set of actions 134 to be performed on the customer resource 108. The permission policy 124 of the delegation role 120 specifies a condition 126 on assuming the customer role 128. The condition 126 on assuming the customer role 128 requires adherence to the down scoping policy 136. The down scoping policy 136 limits the actions that are allowed to be performed on the customer resource 108 to a strict subset 138 of the set of actions 134 allowed by the permission policy 132 of the customer role 128. The optional remote electronic device 140 includes one or more of a command line interface (CLI) 142, a graphical user interface (GUI) 144, or a software development kit (SDK) 146.

Additionally, the system 100 and any component thereof depicted in FIG. 1 can include any other suitable component.

The system 100 includes the provider network 102, which functions to provide a computing environment in which the techniques disclosed herein may be implemented. The provider network 102 is programmed or configured to adhere to a cloud computing model. The model enables ubiquitous, convenient, on-demand network access to a shared pool of configurable resources such as virtual machines, containers, networks, servers, storage, applications, services, or any other configurable resource of the provider network 102. The resources can be rapidly provisioned and released with minimal management effort or service provider interaction.

A user of the provider network 102 (sometimes referred to herein as a "customer" of the provider network 102) provisions resources in the provider network 102, such as virtual machines, containers, server time, network storage, or any other resource, as needed automatically with minimal or no human interaction with the service provider. Resources of the provider network 102 may be available over an intermediate network 148 (e.g., the Internet) and accessed through standard mechanisms that promote use by heterogeneous remote electronic devices (e.g., remote device 140) such as thin or thick client platforms or any other type of computing platform such as desktop computers, mobile phones, tablet computers, laptop computers, workstation computers, smart appliances, Internet-of-Things (IoT) devices, or any other type of electronic device.

Resources such as compute, storage, processing, memory, and network resources in the provider network 102 are pooled to serve multiple customers using a multi-tenant model, with different physical and virtual resources dynamically assigned and reassigned according to customer demand. There is a sense of location independence in that the customer generally has no control or knowledge over the exact location of provided resources but can specify location at a higher level of abstraction such as, for example, at the level of a country, state, datacenter, or any other location granularity. The provider network 102 automatically controls and optimizes resource use by leveraging a metering capability (e.g., on a pay-per-use, on a charge-per-use basis, on a subscription basis, or any other fee basis) at a level of abstraction appropriate to the type of service such as compute, storage, processing, memory, network bandwidth, active customer accounts, or any other suitable level of abstraction. Resource usage in the provider network 102 is monitored, controlled, and reported, providing transparency for both the provider and the customer of a utilized service.

The provider network 102 can provide its capabilities to customers according to a variety of different service models including Software-as-a-Service (SaaS), Platform-as-a-Service (PaaS), Infrastructure-as-a-Service (IaaS), or any other service model.

With SaaS, a capability is provided to a customer using the provider network 102's software applications running on the infrastructure of the provider network 102. The applications may be accessible from various remote electronic devices (e.g., remote device 140) through either a thin client interface such as a command line interface (CLI) 142, a graphical user interface (GUI) 144 (e.g., via a web browser or a mobile or web application), a Software Development Kit (SDK) 146, or any other interface. The infrastructure of the provider network 102 includes the hardware resources such as server, storage, and network resources and software deployed on the hardware infrastructure that support the services being provided. Typically, under the SaaS model, the customer does not manage or control the underlying infrastructure including network, servers, operating systems, storage, or individual application capabilities, except for limited customer-specific application configuration settings.

With PaaS, the customer is provided the capability to deploy, onto hardware and software infrastructure of the provider network 102, customer-created or acquired applications using programming languages, libraries, services, and tools supported by the provider network 102 or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer is provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

The provider network 102 can provide its capabilities to a customer according to a variety of different deployment models including as a private cloud, as a community cloud, as a public cloud, as a hybrid cloud, or any other deployment model.

In a private cloud, the hardware and software infrastructure of the provider network 102 is provisioned for exclusive use by a single organization which can comprise multiple customers. The private cloud is owned, managed, and operated by the organization, a third party, or some combination of them, and it can exist on or off premises.

In a community cloud, the hardware and software infrastructure of the provider network 102 is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

For the purpose of providing a clear example, the provider network 102 is depicted in FIG. 1 as including one delegating service, one assuming service, and one customer resource. However, the provider network 102 in a practical implementation may include multiple delegating services, multiple assuming services, or multiple customer resources. Likewise, for the purpose of providing a clear example, the IAM service 110 is depicted in FIG. 1 as including only one delegation role, one customer role, one down scoping policy, one customer account, one delegating service account, and one assuming service account. However, the IAM service 110 in a practical implementation may include multiple different ones of any or all of these components. Similarly, the system 100 may include multiple remote electronic devices, or multiple intermediate networks connecting remote electronic devices to the provider network 102. Thus, FIG. 1

The delegating service 104 is a service in the provider network 102 that is granted permission to perform the set of actions 134 on the customer resource 108 by the customer where techniques disclosed herein are used to delegate permission to perform the strict subset 138 of those actions 134 on the customer resource 108 to the assuming service 106. Here, the strict subset 138 is less than all the actions 134 such that the assuming service 106 does not have permission to perform at least one action in the actions 134 on the customer resource 108 for which the delegating service 104 has permission to perform on the customer resource 108 as granted by the customer role 128. Through role-based permission delegation as disclosed herein, permission to perform the strict subset of actions 138 on the customer resource 108 is delegated to the assuming service 106 in a way that does not require the customer to change the permissions the customer grants to the delegating service 104 and does not require the customer to grant permissions to perform the strict subset of actions 138 on the resource 108 to the assuming service 106. Indeed, the customer may be unaware that the delegation is occurring. This provides the provider network 102 greater flexibility in delegating role-based permissions across services in the provider network 102 and enables the provider network 102 to carry out tasks on behalf of its customers more efficiently including providing any or all of the following benefits while at the same time complying with the principle of least privilege: increased conservation of limited computing resources of the provider network 102 where the assuming service 106 can perform an action on the customer resource 108 more efficiently than the delegating service 104, reduced error rate in the provider network 102 carrying out tasks on behalf of customers where the assuming service 106 can perform an action on the customer resource 108 more reliably than the delegating service 104, reduced development and maintenance costs to the operator of provider network 102 where the assuming service 106 has pre-existing functionality for performing on action on the customer resource 106 and the delegating service 104 does not have such functionality or the functionality is deprecated, or any other realized benefit or technical effect.

The provider network 102 is constructed according to a service-oriented, web service, or microservice architecture. The architecture integrates distributed separately maintained and deployed services. A service is a discrete unit of software or hardware functionality provided by the provider network 102 that can be accessed remotely (e.g., from remote device 130 or from another service in the provider network 102) and acted upon and updated independently of other services. For example, a service can have any or all of the following properties: logically represent repeatable functionality with a specified outcome, be self-contained, be a "black-box" from the perspective of customers of the provider network 102 in that the customers do not need to be aware of the service's implementation details to gain utility from the service, and be composed of other services in the provider network 102.

A service in the provider network 102 offers an application programming interface (API) that allows the functionality of the service to be accessed remotely, either: (1) by other services in the provider network 102 that are connected to the service by an intermediate network in the provider network 102 (not shown in FIG. 1) or (2) by remote devices (e.g., 130) that are connected to the provider network 102 by the intermediate network 148. An API encompasses a set of one or more data definitions and one or more network communication protocols for building and integrating services or devices. An API is a contract that represents an agreement between services or devices whereby if one service or device sends a remote request through an intermediate network structured in a particular way to another service or device, the other service or device will perform one or more particular actions and respond through the intermediate network in a particular way. For example, an API can be designed based on web standards such as using the Hyper Text Transfer Protocol (HTTP) or other suitable protocol for request messages and for providing a definition of the structure of response messages. A response message can take the form of a machine-readable data format such as eXtensible Markup Language (XML), JavaScript Object Notation (JSON), or any other suitable machine-readable data format. A protocol specification such as Simple Object Access Protocol (SOAP), Representation State Transfer (REST), GraphQL, or any other suitable protocol specification can be used to standardize information exchange via an API. An API can encompass a webhook (equivalently "reverse API" or "push API") which is a HTTP-based callback function that allows lightweight, event-driven communication between two APIs. Webhooks place the responsibility of communication on the service instead of the client. With a webhook, instead of the client sending HTTP requests asking for data, the server sends the client a single HTTP post request as soon as the data is available.

The above API standards and protocols are merely examples of some possible standards and protocols that can be used to implement an API of a service in the provider network 102. Other standards or protocols can be used according to the requirements of the particular service at hand. No particular standard or protocol is required of a service API in the provider network 102.

The provider network 102 offers various services to customers. Some possible services that the provider network 102 could provide include a virtualization service, a relational database service, a data storage service, an on-demand code execution service, a content delivery network (CDN) service, a machine-learning service, among other possible services. The foregoing list of services is merely one example of a set of services that could be offered by the provider network 102. The provider network 102 can offer different services. No particular service or set of services is required.

The virtualization service functions to allows customers to rent virtual computers on which to run their own computer applications. The virtualization service encompasses a web service through which a customer can boot and configure a virtual machine (equivalently an "instance") containing and configured with desired software. Using the web service, the customer can create, launch, or terminate instances as needed, paying for active instances. This capability to create, launch, and terminate instances as needed is sometimes referred to as "elastic" computing.

The relational database service is a distributed database service. The relational database service encompasses a web service that functions to simplify the tasks of setting up, operating, and scaling a relational database for use in customer applications. For example, the relational database service can facilitate administrative processes such as patching database software, backing up the database, enabling point-in-time recovery, or any other suitable relational database administrative task.

The data storage service provides data object storage through a web service interface. The data storage service can store any type of data object and manages data with an object storage architecture that provides scalability, high-availability, low latency access, and high durability. A basic storage unit is an object organized into "buckets." Each object is identifiable by a unique key and has a predetermined maximum size (e.g., five terabytes). A bucket can be managed remotely (e.g., from remote device 140) using a command line interface (e.g., CLI 142), a graphical user interface (e.g., 144), or a software development kit (e.g., SDK 146).

The on-demand code execution service is an event-driven, serverless computing platform. The service executes software code in response to events and automatically manages the computing resources required by code execution. For example, the software code can be programmed in NODE.JS, PYTHON, JAVA, GO, RUBY, C#, or other suitable computer programming language. The service executes code as ephemeral instances. For example, each ephemeral instance can be an operating system container (equivalently a "zone," "virtual private service," "partition," "virtual environment," "virtual kernel," or "jail"). Each instance has access to a limited amount of random-access memory (RAM) (e.g., between 1,128 and 10,240 MB of RAM). Each instance is provided a limited amount of ephemeral data storage (e.g., between 512 MB to 10 GB) which is available only for the duration of the instance and its data contents are discard after the instance terminates. Each instance executes for a limited amount of time (e.g., between 1 and 900 seconds). In operation, a code package containing the code to be executed and up to a maximum compressed size is created or uploaded in the data storage service. For example, the maximum compressed size of the code package can be 50 MB. The on-demand code execution service is instructed (via an API offered by the on-demand code execution service) to download the package from the data storage service and run the contained code in response to an event. The on-demand code execution service can locally cache frequently run packages or code to avoid having to download them from the data storage service each time. Each instance runs in a new environment such that there is no or only limited access to the execution context of previous and subsequent executions of a code. As a result, each instance is essentially stateless, and input data and output data are stored with other services. For example, input data or output data for an instance can be stored with the data storage service or the relational database service.

The content delivery network (CDN) service provides a globally distributed network of proxy servers that cache content such as images, graphics, video, or audio data more locally to the remote electronic devices of customers and users thereby reducing latency for accessing (downloading) the content.

The machine-learning service functions to enable users to create, train, and deploy machine learning models. The machine learning service operates at different levels of complexity when training and deploying machine learning models. For example, the machine learning service may provide pre-trained machine learning model that can be deployed as is, provide built-in machine learning algorithms that customers can use to train a machine learning model, and provide managed instances of a machine learning framework (e.g., TENSORFLOW OR APACHE MXNET) that customers can use to create customer machine learning models.

The above services are just examples of possible services that may be offered by the provider network 102. The provider network 102 may offer different services or offer like services with different functionality or different implementation. No particular service, service functionality, or service implementation is required.

The delegating service 104 is a service in the provider network 102. In examples discussed herein, the delegating service 104 is an event bus service. The event bus service is an event bus that functions to allow customer applications implemented in the provider network 102 to receive, filter, transform, route, and deliver events. In operation, the event bus service receives events. For example, an event may indicate a change in the environment of the provider network 102 and may be represented as a JSON object or the like. An event has a set of fields. For example, an event can have one or more fields such as any of all the following fields: "id," "detail-type," "source," "account," "time," "region," "resources," "detail," or any other suitable event field. The value of the "id" field provides a unique identifier for the event. The value of the "detail" field indicates the type of the event. The value of the "source" field identifies a service in the provider network 102 that generated the event. The value of the "account" field identifies a customer account held with the provider network 102 that is associated with the event. The value of the "time" field includes a timestamp (date and time) of the event (e.g., when the event occurred or was generated). The value of the "region" field identifies a geographic region of the provider network 102 where the event originated. The value of the "resources" field identifies one or more resources (e.g., virtual machine instances) in the provider network 102 involved in the event. The value of the "detail" field contains a nested JSON object or the like that contains information about the event that is particular to the type of the event indicated by the value of the "detail-type" field or the value of the "source" field.

The above are just some examples of possible event fields. An event received by the event bus service may contain different fields. No particular event or set of event fields is required.

Upon receiving an event, the event bus service applies a rule to route the event to a target for further processing. For example, the definition of the rule and the selection of the target can be configured by a customer using an API of the event bus service. A target is a resource in the provider network 102 to which the event bus service sends an event when the event matches a rule. A rule defines the event structure and the fields that the rule matches. For example, a rule can be a regular expression that matches or does not match one or more field names of an event or one or more values of one or more fields of the event (e.g., the value or values of the "source," "detail-type," or "detail" field of the event.) For example, when the event bus service receives an event representing a change of a virtual machine instance from a pending state to a running state, a rule of the event bus service can send the event to an on-demand code execution service instance for further processing. In addition to or as alternative to a rule based on an event pattern, a rule is based on a schedule performs an action at a regular interval. For example, a rule may periodically trigger execution of an on-demand code execution service instance on a schedule (e.g., according to a cron expression or a rate expression).

While in examples discussed herein the delegating service 104 is the event bus service, the delegating service 104 and the invention generally is not so limited. For example, the delegating service 104 can be a different type of service in the provider network 102 (e.g., a virtualization service, an on-demand code execution service, a relational database service, or other service in the provider network 102.) The example of the event bus service is provided for the purpose of providing clear examples, but it is not intended for the invention to be limited to implementations where the delegating service 104 is an event bus service. The delegating service 104 can be a different type of service in the provider network 102 according to the requirements of the particular implementation at hand.

By way of the permission policy 132 of the customer role 128 authored by the customer, the delegating service 104 is granted permission by the customer to perform the set of actions 134 on the customer resource 108. For example, the customer resource 108 can be a message queue in the provider network 102 provisioned to the customer. In this case, the permission policy 132 of the customer role 128 may grant the delegating service 104 permission to perform certain actions on the customer resource 108 such as, for example, receiving and deleting messages from the message queue. This is merely one example of the set of actions 134 that the permission policy 132 of the customer role 128 may grant permission to the delegating service 104 to perform on the customer resource 108. Permission to perform different sets of actions are possible. No particular permission or action is required.

A granted permission in the permission policy 132 of the customer role 128 to perform an action on the customer resource 108 inherently includes permission to perform any lesser action on the customer resource 108. For example, where the customer resource 108 is a message queue, the permission to read messages from the message queue may inherently include the permission to poll the message queue for new messages. As another example, where the customer resource 108 is a database table, the permission to write data to the database table may inherently include the permission to read the data from the database table. In this case, a grant of a permission in the permission policy 132 of the customer role 128 to perform an action on the customer resource 108 inherently includes permission to perform any lesser action on the customer resource 108. What is considered a lesser action will vary depending on the action for which permission is expressly granted.

Alternatively, a granted permission to perform an action on the customer resource 108 does not inherently include permission to perform a lesser action on the customer resource 108. In this case, the permission policy 132 of the customer role 128 must grant permission to perform any lesser actions. For example, where the customer resource 108 is a message queue, the permission policy 132 of the customer role 128 can grant the delegating service 104 permission to receive messages from the message queue, delete messages from the message queue, and poll the message queue for new messages.

With permission from the customer to perform the set of actions 134 on the customer resource 108 by way of the permission policy 132 of the customer role 128, the delegating service 104 can perform those actions on the customer resource 108 on behalf of the customer. For example, where the delegating service 104 is the event bus service, the delegating service 108 can poll the message queue for new messages, read messages from the queue, and delete messages from the queue.

However, one or more actions of the set of actions 134 that the delegating service 104 has permission from the customer to perform on the customer resource 108 may be more efficiently performed by the assuming service 106. For example, the on-demand code execution service, due to its "serverless" nature, may perform the action of polling the message queue more efficiently than the event bus service. In this case, it may be desirable to use a schedule rule of the event bus service to periodically launch an on-demand code execution service instance that polls the message queue for any new messages available. An output of the on-demand code execution service instance can indicate whether new messages are or are not available in the message queue according to the latest poll. If new messages are available, then the event bus service can receive the output of the on-demand code execution service instance as an event. An event pattern rule of the event bus service can be used to match events indicating a new message is available in the message queue. When such an event is matched, the event bus service can read the new message from the message queue. With this separation of actions, the event bus service is relieved of the task of polling the message queue for new messages which is more efficiently performed by the on-demand code execution service due to its serverless nature.

The above example of polling a message queue is merely one example of the situation where the delegation service 104 is granted permission by a customer to perform the set of actions 134 on the customer resource 108 where one or more of the set of actions 134 is more efficiently performed by the assuming service 106. Permission to perform other sets of actions may be granted by the customer to the delegating service 104 and different actions may be more efficiently performed by the assuming service 106. No particular set of actions, delegated action, or resource is required.

Computational efficiency is one reason why permission to perform an action is delegated to the assuming service 106. However, there can be other reasons in addition to or as alternative to improved computational efficiency. For example, the permission may be delegated for administrative or organizational reasons. For example, software developers on a team responsible for maintaining the on-demand code execution service may have already developed code for polling message queues for execution as on-demand code execution service instances where no such equivalent functionality currently exists with the event bus service. In this example, it may be administratively or organizationally more efficient (e.g., more cost effective) to delegate permission to perform the action of polling a message queue to the on-demand code execution service because the programmed functionality already exists whereas additional software development time and effort would be needed to add the polling functionality to the event bus service. Security is another reason to delegate. For example, the assuming service 106 may have access to an encryption key of the customer needed to perform a certain action on the customer resource 108. In this case, the action can be delegated to the assuming service 106 instead of providing additional access to the encryption key to the delegating service 104.

The above are just some examples of reasons why permission to perform an action on the resource 108 may be delegated to the assuming service 106. There may be other reasons for doing so in addition to or alternative to the above reasons. No particular reason is required.

A service in the provider network 102 has an identifier (equivalently an "identity") referred to herein as a "service principal." A service principal of a service such as the delegating service 104 or the assuming service 106 takes a form suitable for distinguishing one service from another in the provider network 102. For example, a service principal can belong in a hierarchical namespace of service principals akin to the hierarchical format of domain name service domain names. For example, a service principal for a service in the provider network 102 can have the general format: "<service-name>.examplepn.com" where "examplepn.com" is an example a top-level domain name service domain name for the provider network 102 and <service-name> is a placeholder for a name of the service. For example, if the delegating service 104 is an event bus service, then a service principal for the delegating service 104 could be "evtbussvc.examplepn.com" where "evtbussvc" is a name given to the event bus service. As another example, if the assuming service 106 is an on-demand code execution service, then a service principal for the assuming service 106 could be "codeexecsvc.examplepn.com" where "codeexecsvc" is a name given to the on-demand code execution service.

The service principal of a service is additionally or alternatively a shortened name or alias that omits a common top-level portion. For example, where a set of services in the provider network 102 share a common top-level portion of their respective service principals such as "examplepn.com" in the preceding examples, then valid service principals of the services can encompass just their service names (e.g., "evtbussvc" or "codeexecsvc") as opposed to having to use their fully qualified service principals (e.g., "evtbussvc.examplepn.com" or "codeexecsvc.examplepn.com") where the common top-level portion is implied or unambiguous.

A hierarchical service principal allows for more granular (equivalently "nested") service principals. For example, a sub-service, component, or resource of a service can have a nested service principal that is nested within the service principal of the service. For example, a resource of the event bus service might have a service principle of "pipes.evtbussvc.examplepn.com" or just "pipes.evtbussvC" which is nested within the service principal of "evtbussvc.examplepn.com" or just "evtbussvc" which is the service principal for the event bus service. A nested service principal can be used to identify a particular sub-service, component, or resource of a service distinct from the service generally. This can be useful, for example, to grant permission to perform an action on a resource to just a particular sub-service, component, or resource of a service without also granting the permission to the service generally.

The assuming service 106 is a service in the provider network 102 that obtains permission to perform the strict subset 138 of the set of actions 134 on the customer resource 108. The assuming service 106 obtains the permission to perform the strict subset of actions 134 on the customer resource 108 using role-based permissions.

An IAM role (or just "role") is an IAM identity (or just "identity") that exists in IAM service 110, that is associated with a customer account, and that has specific permissions. Stated otherwise, a role is an identity encompassing a permission policy that determines what the identity can and cannot do on resources in the provider network 102 provisioned to the customer. The customer role 128 and the delegation role 120 are two examples of a role.

A role can be assumed by a service in the provider network 102 that needs it. For example, a service may assume a role to perform an action of a resource (e.g., resource 108) in the provider network 102 on behalf of a customer. A role does not have standard long-term credentials such as a password or access keys associated with it.

Instead, when a service assumes a role, it is provided with temporary security credentials by temporary credential service 112. A role that a service assumes to perform an action of a resource in the provider network 102 provisioned to a customer is sometimes referred to herein as a "service" role. A service role includes permission required for the service to access the resources in provider network 102 it needs to carry out tasks on behalf of the customer. For example, customer role 128 may grant permission to delegating service 104 to perform the set of actions 134 on the customer resource 108. For example, where the delegating service 104 is the event bus service and the customer resource 108 is a message queue provisioned to the customer, the permission policy 132 of the customer role 128 might grant permission to the delegating service 104 to perform the actions of receiving messages from the message queue, deleting messages from the message queue, and polling the message queue for new messages.

A role has an identity referred to herein as a "role" principal. A role principal uniquely identifies the role in a string data format. A role principal of a role can be used to identify the role in a permission policy. For example, a role principal may take the data form of a Uniform Resource Name (URN), Universal Unique Identifier (UUID), or the like. However, no particular data format is required for a role principal. For example, a role principal can have a general resource naming format of:

"rn:<partition>:<service>:<region>:<account-id>:<resource-type>/<resource-id>."

Here, "rn" stands for "resource name" to indicate that what follows are components a resource name identifying a resource in the provider network 102. The <partition> component refers to a partition of the provider network 102 where the resource is located. The <service> component identifies a service in the provider network 102 to which the resource belongs. The optional <region> component identifies a geographic region of the provider network 102 where the resource is located. The <account-id> component is an identifier of the customer account that owns the resource or to which the resource is provisioned. The <resource-type> component identifies the type of resource. The <resource-id> component is an identifier of the resource.

For example, a role principal of the customer role 128 could be the following resource name:

"rn:examplepn:iamsvc::111122223333:role/customer-role-1."

In this example, the <partition> is "examplepn" which refers to the provider network 102. The <service> is "iamsvc" which refers to IAM service 110 in the provider network 102. No region is specified indicating that the role principal can be used to identify the role across all regions of the provider network 102. The example <account-id> of "111122223333" identifies the customer account 114 held with the provider network 102 by its account identifier. The customer account 114 owns the customer role 128. The <resource-type> is "role" and the <resource-id> is "customer-role-1."

The above role principal string data format is just one example of a possible string data format that can be used to identify roles within the provider network 102. Additionally or alternatively, other string data formats including those based on web standards such as the Uniform Resource Names (URNs) standard (Request for Comments (RFC) 8141) or the Universal Unique Identifier (UUID) standard (RFC 4122) can be used. No particular string data format is required and any string data format suitable for identifying a role managed by IAM service 110 can be used.

A role has a trust policy. For example, both customer role 128 and delegation role 120 have trust policies 130 and 122, respectively. A trust policy of a role defines the principals that are trusted to assume the role. A trusted principal can be a service principal. For example, the trust policy 130 of customer role 128 can define that delegating service 104 is trusted to assume the customer role 128. An example of trust policy 130 is provided herein. As another example, the trust policy 122 of the delegation role 120 can define that assuming service 106 is trusted to assume the delegation role 120. An example of trust policy 122 is provided herein.

A role has a permission policy. For example, both the customer role 128 and the delegation role 120 have permission policies 132 and 124, respectively. A permission policy of a role defines what actions and resources the role can use. For example, the permission policy 132 of the customer role 128 can define that the customer role 128 is authorized to perform the set of actions 134 on the customer resource 108. For example, if the customer resource 108 is a message queue and the set of actions authorized could include reading new messages from the message queue, deleting messages from the message queue, and polling the message queue for new messages. An example of permission policy 132 of the customer role 128 is provided herein.

As another example, the permission policy 124 of the delegation role 120 can define that the delegation role 120 is authorized to perform a set of actions on any resource under a certain condition 126. The condition 126 effectively requires that the delegation role 120 assume the customer role 114 with permission to perform the strict subset 138 of the set of actions 134 as defined by down scoping policy 136. An example of the permission policy 124 of the delegation role 120 including an example of the condition 126 is provided herein. In addition, an example of the down scoping policy 136 is provided herein.

The assuming service 106 acquires the permission to perform an action delegated to it (equivalently "a delegated action") by a role chaining process. In particular, the delegation role 120 is used by the assuming service 106 to assume the customer role 114 but with the down scoped permissions enforced by the condition 126 and the down scoping policy 136. The down scoped permissions limit the action or actions that can be performed by the assuming service 106 acting in the customer role 128 to the strict subset 138 of the set of actions 134. For example, the delegation role 120 can have permission to assume the customer role 114 subject to the condition 126. In this case, the assuming service 106 can first assume the delegation role 120. Then, with the temporary credentials of the delegation role 120, the assuming service 106 can assume the customer role 114 subject to the condition 126.

Figure 2:
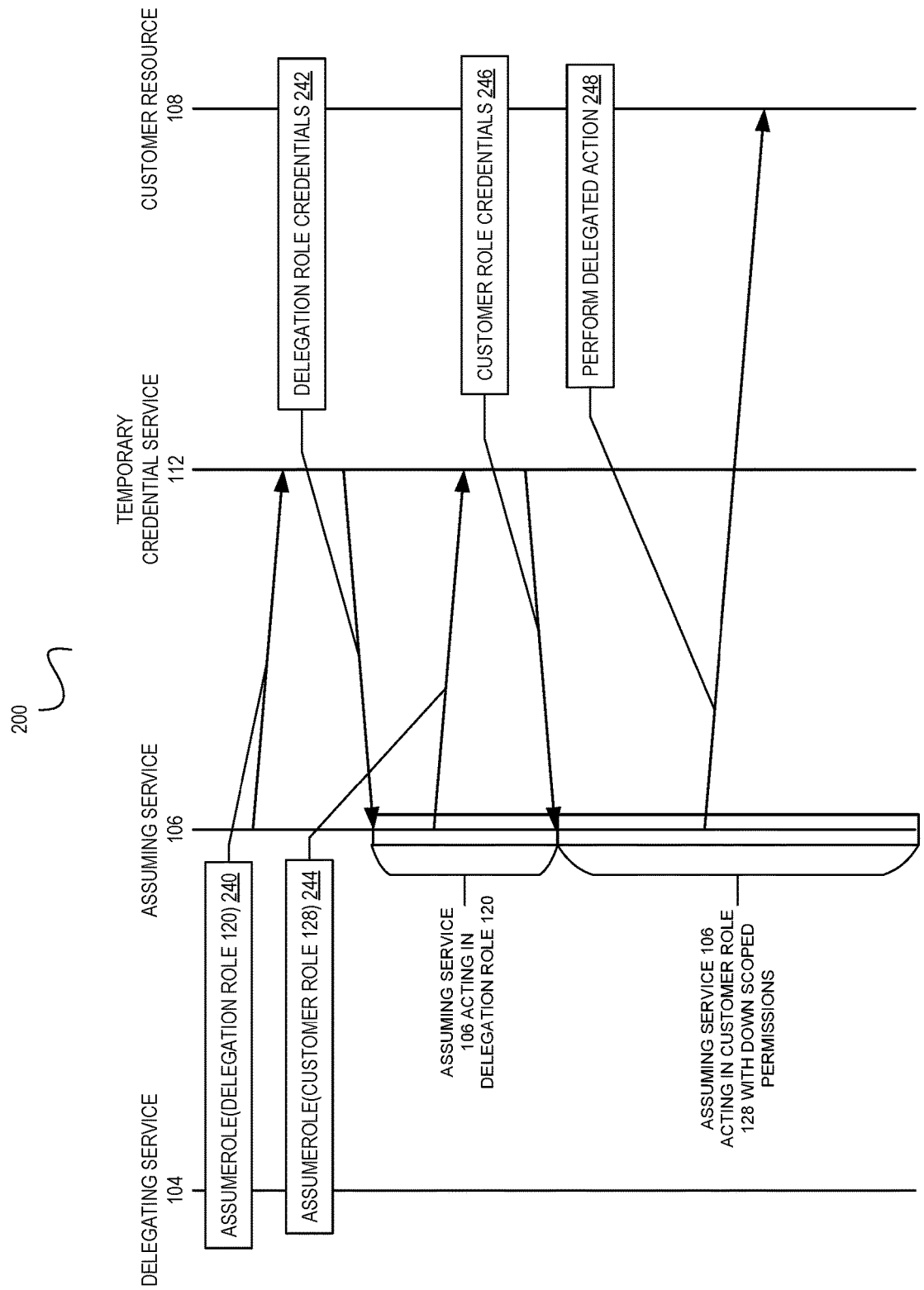
FIG. 2 illustrates an example of role chaining.

FIG. 2 is an interaction diagram that illustrates role chaining. At operation 240, the assuming service 106 sends a request to the temporary credential service 112 to assume the delegation role 120. At operation 242, temporary security credentials for the delegation role 120 are returned by the temporary credential service 112 to the assuming service 106 in response to the assume role request of operation 240. Using the temporary security credentials for the delegation role 120, the assuming service 106 can act in (with the identity of) the delegation role 120. At operation 244, the assuming service 106 uses the temporary security credentials for the delegation role 120 to make a request of the temporary credential service 112 to assume the customer role 114 in compliance with the condition 126. To comply with the condition 126, the assuming service 106, when making the assume role request at operation 244, must request permission to perform only an action or actions allowed by the condition 126 (equivalently "a delegated action") where the allowed action or actions are those in the strict subset 138 of the set of actions 134 defined by the down scoping policy 136. At operation 246, temporary security credentials for the customer role 114 with the down scoped permissions are returned by the temporary credential service 112 to the assuming service 106 in response to the assume role request of operation 244. Using the temporary security credentials for the customer role 114 with the down scoped permissions, the assuming service 106 can in (with the identity of) the customer role 114 but with permission to perform the strict subset of actions 138 on the customer resource 108 and not permission to perform all actions 134 on the customer resource 108. At operation 248, the assuming service 106 performs a delegated action in the strict subset 138 on the resource 108.

As a concrete example, assume the customer resource 108 is a message queue. The permission policy 132 of the customer role 128 can grant permission to the delegating service 104 to perform READ, DELETE, and POLL actions on the message queue. The trust policy 122 of the delegation role 120 can grant permission to the assuming service 106 to assume the delegation role 120. The permission policy 124 including the condition 126 of the delegation role 120 can authorize the delegation role 120 to assume the customer role 114 but only with permission to perform the POLL action on the message queue and without permission to perform the READ or DELETE operations on the message queue. In this case, after successfully assuming the delegation role 120 and receiving temporary security credentials therefore at operation 242, the assuming service 106 acting in the delegation role 120 can assume the customer role 114 only if the assume role request at operation 244 requests permission to perform the POLL action on the message queue and does not also request permission to perform either the READ or DELETE actions on the message queue.

While in examples discussed herein the assuming service 106 is the on-demand code execution service, the assuming service 106 and the invention generally is not so limited. For example, the assuming service 106 can be a different type of service in the provider network 102 (e.g., a virtualization service, a relational database service, etc.) The example of the on-demand code execution service is provided for the purpose of providing a clear example, but it is not intended for the invention to be limited to implementations where the assuming service 106 is an on-demand code execution service. The assuming service 106 can be a different type of service in the provider network 102 according to the requirements of the particular implementation at hand.

The customer resource 108 is an object that exists within a service of the provider network 102. For example, the customer resource 108 can be a message queue that exists within a message queuing service of the provider network 102. However, the customer resource 108 is not limited to any particular resource or any particular type of resource. The service that contains the customer resource 108 defines which possible actions can be performed on the customer resource 108. For example, a message queuing service may support any or all of the following actions on a message queue: creating a message queue, deleting a message from a message queue, polling a message queue for new messages, receiving a message from a message queue, delivering (sending) a message to a message queue, or any other suitable message queue action. However, a service is not required to support any particular action or set of actions on a resource. And the action or actions on a resource support by a service may vary between different types of resource and different services.

The customer resource 108 can be an object within a service that is protectable by IAM service 110. To be protectable by IAM service 110, the customer resource 108 has an identity referred to herein as a "resource" principal. Like a service principal and a role principal discussed above, a resource principal is a string data type that uniquely identifies a resource in provider network 102. For example, a resource principal may take the data form of a Uniform Resource Name (URN), Universal Unique Identifier (UUID), or the like. However, no particular data format is required for a resource principal.

For example, a resource principal can have a general resource naming format of:

"rn:<partition>:<service>:<region>:<account-id>:<resource-type>/<resource-id>."

The above general resource name format is discussed in greater detail above with respect to discussion of role principals.

For example, the resource principal for the customer resource 108 could be:

"rn:examplepn:qsvc:us-west-1:111122223333:queue/some-queue-1."

In this example, the <partition> is "examplepn" which refers to the provider network 102. The <service> is "qsvc" which refers a message queuing service in the provider network 102.

The region is "us-west-1" indicates that the resource 108 is located US West (N. California) geographic region of the provider network 102. The example <account-id> of "111122223333" identifies the customer account 114 held with the provider network 102 by its account identifier. The resource 108 is provisioned to that customer account 114. The <resource-type> is "queue" and the <resource-id> is "some-queue-1."

The above resource principal string data format is just one example of a possible string data format that can be used to identify resources in provider network 102. Additionally or alternatively, other string data formats including those based on web standards such as the Uniform Resource Names (URNs) standard (Request for Comments (RFC) 8141) or the Universal Unique Identifier (UUID) standard (RFC 4122) can be used. No particular string data format is required and any string data format suitable for identifying a resource in the provider network 102 can be used.

While in examples discussed herein the customer resource 108 is a message queue of a message queuing service in the provider network 102, the customer resource 108 and the invention generally is not so limited. For example, the customer resource 108 can be a different type of resource in the provider network 102 belonging to a different service. For example, the customer resource 108 could be a database table of a database management service in the provider network 102. As other examples, the customer resource 108 could be a virtual machine instance of a virtualization service in the provider network 102 or the customer resource 108 could be a data object stored by a data storage service in the provider network 102. The example of the message queue is provided for the purpose of providing a clear example, but it is not intended for the invention to be limited to implementations where the customer resource 108 is a message queue. And the customer resource 108 can be a different type of resource in the provider network 102 according to the requirements of the particular implementation at hand.

IAM service 110 functions to securely control access to resources in provider network 102 by authorizing "request" principals to perform actions on resources in the provider network 102. A request principal can include, but is not limited to, a role principal. When a "requesting" service (e.g., assuming service 106) in the provider network 102 sends a request (e.g., a HTTP or HTTP request) to a "target" service (e.g., a service that provides access to customer resource 108) in the provider network 102 to perform an action on a resource (e.g., resource 108), IAM service 110 evaluates and authorizes the request based on a request context of the request. The request context can encompass data that specifies any or all of: the requested action to be performed, the resource being requested, the request principal (e.g., the role principal), environment data (e.g., information about a network address, user agent, SSL enabled status, or current date/time associated with requesting service sending the request), resource data (e.g., data related to the resource that is being requested such as a database table name or an identifier of a virtual machine instance), or any other suitable request context data.

If the requesting service has successfully assumed a role (e.g., delegation role 120), then the requesting service obtains temporary security credentials from the IAM service 110 for the assumed role. For example, the temporary security credentials can include an access key identifier that identifies the temporary security credentials, an expiration which is the date/time at which the temporary security credentials expire, a secret access key that can be used to cryptographically sign requests as the role principal, and a session token that the requesting service passes to the target service to use the temporary security credentials. The request context of the request by the requesting service can include the session token of the temporary security credentials. Additionally or alternatively, the request or the request context is cryptographically signed using the secret access key of the temporary security credentials.

For authorization, IAM service 110 uses values from the request context to check for any polices that apply to the request. IAM service 110 then uses the applicable policies to determine whether to allow or deny the request. A policy is stored with IAM service 110 in a machine-readable format. For example, the machine-readable format can be JavaScript Object Notation (JSON), eXtensible Markup Language (XML), or the like. According to the principle of least privilege, IAM service 110 typically denies a request by default and an allow permission in a policy can override the default deny. If multiple polices apply to a request and one policy denies the request while another policy allows the request, then the deny overrides the allow and the request is denied by IAM service 110. Trust policy 130, permission policy 134, trust policy 122, and permission policy 124 are examples of policies and are discussed in greater detail below.

2.6 Temporary Credential Service

Temporary credential service 112 of IAM service 110 provides an API that allows a service in the provider network 102 (e.g., assuming service 106) to assume a role. To assume a role, the assuming service 106 makes an assume role request of the temporary credential service 112. If the assume role request is successful, then the temporary credential service 112 returns temporary security credentials for the assumed role.

The assume role request accepts a number of request parameters including, among other possible parameters, a "role session duration" parameter and a "role identifier" parameter. The role session duration parameter specifies the duration (e.g., in seconds) of validity of the temporary security credentials for the assumed role that are returned by the temporary credential service 112. If no value is provided for the role session duration parameter in the assume role request, then a default duration (e.g., 3600 seconds) is used by the temporary credential service 112 when generating the temporary security credentials to return to the requesting service. A minimum allowed duration (e.g., 900 seconds) and a maximum allowed duration (e.g., 432000 seconds) constrain the possible values for the role session duration parameter. After the validity period has passed, the requesting service can no longer use the temporary security credentials to perform actions in the assumed role. The requesting service must issue a new assume role request to the temporary credential service 112 to obtain a new set of temporary security credentials for the assumed role with an updated validity period. The role identifier parameter specifies the role principal of the role to assume.

When the assuming service 106 makes an assume role request, the assuming service 106 can specify a set of session tags. A session tag is a key-value pair. Also when the assuming service 106 makes an assume role request, the assuming service 106 cryptographically signs the request using a secret cryptographic key that represents an identity of the assuming service 106. For example, the assuming service 106 can sign the assume role request using a secret key associated with the assuming service account 118. By doing so, the temporary credential service 112 authenticates the assume role request and determines that the assume role request is being made by the assuming service account 118.

The assume role request that is signed by the assuming service 106 includes one or more session tags. The temporary credential service 112 evaluates polices based on the session tags in the assume role request. When the assuming service 106 makes the assume role request to assume the delegation role 120, at least two session tags are specified in the assume role request by the assuming service 106. One session tag has a key named "AssumableCutomterRoleRn." The other tag has a key named "SourceRn." These key names are merely examples of possible session tag names and other names could be used.

The value of the "AssumableCustomerRoleRn" session tag must be a role principal of the role that the assuming service 106 is requesting to assume. For example, the value of the "AssumableCustomerRoleRn" can be the role principal for the customer role 128. The purpose of requiring this session tag is so that the temporary credential service 112 can enforce the goal that the assuming service 106 assume the delegation role 120 only for the purpose of assuming the customer role 128 and no other role.

The value of the "SourceRn" session tag must be a resource principal of a resource that is the type of resource that the assuming service 106 is facilitating work for. For example, the value of the "SourceRn" session tag can be the resource principal of a resource of the delegating service 104. The purpose of requiring this session tag is for confused deputy mitigation. A confused deputy is a security issue where an entity that does not have permission to perform an action can coerce a more-privileged entity to perform the action.

Figure 3:
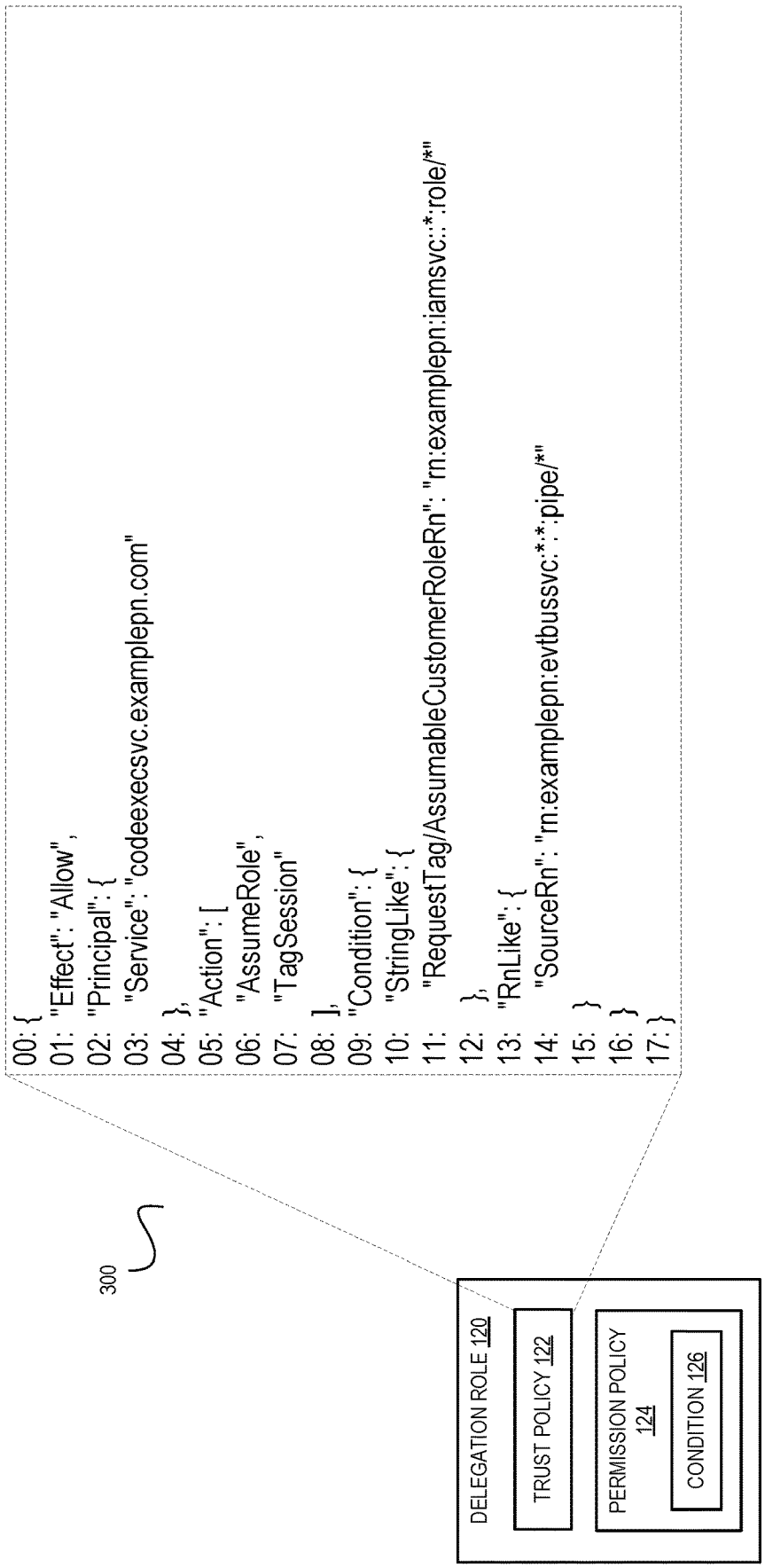
FIG. 3 illustrates an example of a trust policy of a delegation role.

FIG. 3 is an example the trust policy 122 of the delegation 120. The temporary credential service 112 evaluates the trust policy 112 when the assuming service 106 acting in the assume service account 118 makes a request of the temporary credential service 112 to assume the delegation role

120. Trust policy 122 is defined in JSON format but other machine-readable formats (e.g., XML) could be used. Line numbers (e.g., "07") are used for reference in FIG. 1 but are not part of the trust policy 122. Overall, the trust policy 122 grants (allows) permission (Line 01) to the assuming service 106 (Lines 02-04) to perform a set of actions (Lines 05-08) under a condition (Lines 09-16). In this example, the assuming service 106 is the on-demand code execution service. The service principal of the on-demand code execution service is used at Line 03 to specify the service (e.g., the assuming service 106) that is being granted permissions by the trust policy 122. The set of actions at Lines 05-08 include permission to perform the assume role action and permission to perform a tag session action. The tag session action permission allows the assuming service 106 to specify session tags such as the "AssumableCustomerRoleRn" session tag and the "SourceRn" session tag in the assume role request.

The condition at Lines 09-16 defines two sub-conditions both of which must be satisfied to satisfy the overall condition according to an implied logical AND operator on the two sub-conditions. The first sub-condition at Lines 10-12 requires the assuming service 106 to specify a value for the "AssumableCustomerRoleRn" session tag where the value matches the string expression pattern specified in the first sub-condition in which the asterisk character ('*') is used a wildcard match. In particular, when assuming the delegation role 120, the first sub-condition requires the assuming service 106 to supply a value of the "AssumableCustomerRoleRn" session tag in the assume role request that matches the pattern of a role principal. This serves the goal of the assuming service 106 assuming the delegation role 120 only for the purpose of assuming the role identified by the value of the "AssumableCustomerRoleRn" session tag (e.g., the customer role 128) and no other role. The second sub-condition at Lines 13-15 requires the assuming service 106 to specify a value for the "SourceRn" session tag where the value matches the string expression specified in the second sub-condition in which the asterisk character ('*') is used a wildcard match. In particular, when the assuming the delegation role 120, the second sub-condition requires the assuming service 106 to supply a value of in the assume role request that matches the pattern of a resource principal of the type of resource that the assuming service 106 is facilitating work for. The purpose of requiring this session tag is for confused deputy mitigation. A confused deputy is a security issue where an entity that does not have permission to perform an action can coerce a more-privileged entity to perform the action. In the example trust policy 122 of FIG. 3, the delegating service 104 is the event bus service and the assuming service 106 is facilitating work on behalf a "pipes" resource of the delegating service 104.

The assuming service 106 initially acts with the identity of the assuming service account 118. Then, the assuming service 106 requests the temporary credential service 112 to assume the delegation role 120. In doing so, the assuming service 106 specifies a value for the "AssumableCustomerRoleRn" session tag and a value for the "SourceRn" session tag. For example, the value for the "AssumableCustomerRoleRn" session tag can be the role principal of the customer role 128 and the value for the for the "SourceRn" session tag can be a resource principal of a resource of the delegating service 104. Upon receiving the assume role request, the temporary credential service 112 verifies that the values of the AssumableCustomerRoleRn" and the "SourceRn" session tags satisfy the condition of the trust policy 122 of the delegation role 120. If satisfied, then the temporary credential service 112 returns temporary security credentials that allows the assuming service 106 to act in the delegation role 120. For example, the temporary security credentials can allow the assuming service 106 to perform the assume role and the tag session actions while acting in (with the identity of) the delegation role 120. Note that if the assuming service 106 when requesting to assume the delegation role 120 does not specify valid values for the "AssumableCustomerRoleRn" and the "SourceRn" session tags, then the condition of the trust policy 122 of the delegation role 120 is not satisfied and the temporary credential service 112 will not return valid temporary security credentials to the assuming service 106 for acting in the delegation role 120.

Next, if the assuming service 106 has successfully assumed the delegation role 120, then the assuming service 106 can proceed to assume the customer role 128 subject to the condition 126 of the permission policy 124 of the delegation role 120. FIG. 4 is an example of the permission 124 of the delegation role 120 that is evaluated by the temporary credential service 112 when the assuming service 106 acting in (using the identity of) the delegation role 120 requests to assume the customer role 128. Overall, the permission policy 124 allows (Line 01) a set of actions (Lines 02-05) to performed on any resource (Line 06) under the condition 126 (Lines 07-18). In this example, the set of actions at Lines 02-05 include permission to perform the assume role action and the permission to perform the tag session action. The permission to perform the assume role action allows the assuming service 106 acting in the delegation role to make the assume role request of the temporary credential service 112 to assume the customer role 128. The permission to perform the tag session action allows the assuming service 106 to specify one or more session tags when making the request to assume the customer role 128.

The condition 126 is effectively a condition on the assuming service 106 assuming the customer role 128 when acting in the delegation role 120. The condition 126 has sub-conditions that are logically ANDed together to form the overall condition 126. In other words, all sub-conditions must be satisfied for the condition 126 to be satisfied.

The first sub-condition at Lines 08-10 allows the assuming role 106 acting in the delegation role 120 to only assume the role specified as the value of the "AssumableCustomerRoleRn" session tag when making the request to assume the delegation role 120. For example, the first sub-condition allows the assume role 106 acting in the delegation role 120 to only assume the customer role 128.

When the temporary credential service 112 evaluates a policy such as the permission policy 124 of the delegation role 120 against a request to assume a role such as a request by the assuming service 106 acting in the delegation role 120 to assume the customer role 128, certain session tags may be automatically set in the request context of the request by the IAM service 110. These automatically set session keys are sometimes referred to as "condition" session keys. The temporary credential service 112 can evaluate a condition (e.g., condition 126) of a policy in terms of condition session keys in addition to or as an alternative to a session key supplied by the requesting service (e.g., the assuming service 106).

The "ResourceRn" session key referenced by the first sub-condition of condition 126 (Line 09) is an example a condition session key. The value of the "ResourceRn" condition session key is set by IAM service 110 to the resource principal of the resource that is being requested. For example, when the assuming service 106 acting in the delegation role 120 requests to assume the customer role 128, the resource being requested is the customer role 128 and the value of the "ResourceRn" condition session key is set of the role principal of the customer role 128. Thus, the first sub-condition checks that the role that is requested to be assumed by the assuming service 106 when acting in the delegation role 120 is the same role that was declared when the assuming service 106 requested to assume the delegation role 120. For example, if the assuming service 106 acting as the assuming service account 118 specified the role principal for the customer role 128 as the value of the "AssumableCustomerRole" session key when requesting to assume the delegation role 120, then the first sub-condition of condition 126 checks that the customer role 128 is requested to be assumed when the assuming service 106 makes an assume role request acting in the delegation role 120. The temporary credential service 112 checks the first sub-condition when the assuming service 106 acting the delegation role 120 requests to assume a role. If the first sub-condition is not satisfied, then the condition 126 is not satisfied. The first sub-condition of condition 126 serves the goal of ensuring that the assuming service 106 assumes the delegation role 120 for the purpose of assuming the customer role 128 and no other role.

A second sub-condition (Lines 11-14) serves the goal of ensuring that the assuming service 106 is not escalating privileges. Both the "ResourceServiceName" and the "Resource Account" session tags are condition session tags. The "ResourceServiceName" condition session tag is set by the IAM service 110 to a set of one or more service principals of a set of one or more services that own the role being assumed. For example, when the assuming service 106 acting in the delegation role 120 requests to assume the customer role 128, the "ResourceServiceName" is not set to the service principal of the delegating service 104 because the delegating service 104 does not own the customer role 128. The second sub-condition verifies that the role being assumed does not belong to the delegating service 104 or other services listed by the second sub-condition. Specifically, Lines 11 and 12 test whether each value in the set of one or more values of the "ResourceServiceName" condition session key does not match any value in the list of one or more values listed in the condition at Line 12. The "ResourceAccount" condition session tag is set by the IAM service 110 to a set of one or more account identifiers of a set of one or more accounts that own the role being assumed. For example, when the assuming service 106 acting in the delegation role 120 requests to assume the customer role 128, the "ResourceAccount" is not set of the account identifier of the delegating service account 116 because the delegating service account 116 does not own the customer role 128. The second sub-condition verifies that the role being assume does not belong to the delegating service account 116 or other accounts listed by the second sub-condition. Specifically, Lines 11 and 13 test whether each value in the set of one or more values of the "ResourceAccount" condition session key does not match any value in the list of one or more values listed in the condition at Line 13. Overall, the second sub-condition ensures that when the assuming service 106 acting in the delegation role 120 requests to assume a role that the role does not belong to a service or an account that is not authorized. For example, the assuming service 106 acting in the delegation role 120 is not authorized to assume a role belonging to the delegating service 104 or the delegating service account 116.

While the second sub-condition can include evaluating both the "ResourceServiceName" condition session tag and the "ResourceAccount" condition session tag as depicted in FIG. 4, the second sub-condition can include evaluating just one of those condition session key. For example, the second sub-condition can include evaluating just the "ResourceServiceName" condition session tag or evaluating just the "ResourceAccount condition session tag.

Figure 5:
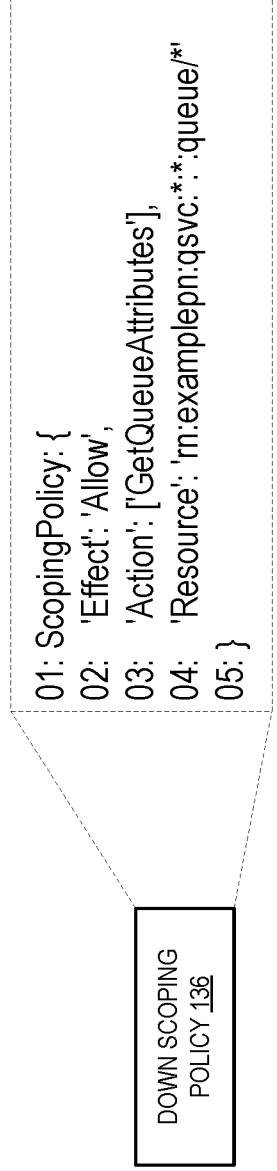
FIG. 5 illustrates an example of a down scoping policy

A third sub-condition (Lines 15-17) requires that assuming service 106 when acting in the delegation role 120 and when requesting to assume the customer role 128 to specify the down scoping policy 136 by a resource name of the policy 136. Alternatively, the assuming service 106 can specify the down scoping policy 136 inline (e.g., as a JSON object or the like comprising the text of policy 136) in the assume roll call instead of specifying policy 136 by reference or by pointer. Upon receiving the assume role request, the temporary credential service 112 limits the permissions granted to the assuming service 106 to those specified in the down scoping policy 136. Specifically, the permissions are limited to performing the strict subset of actions 138 on the customer resource 108. For example, FIG. 5 shows an example of down scoping policy 136. In this example, the permissions granted to the assuming service 106 are limited to perform the "GetQueueAttributes" action on the customer resource 108. For example, when the customer resource 108 is a message queue, the assuming service 106 may perform the "GetQueueAttributes" action on the message queue. This action may allow the assuming service 106 to determine if there are new messages in the message queue without the ability to read or delete the new messages.

Figure 6:
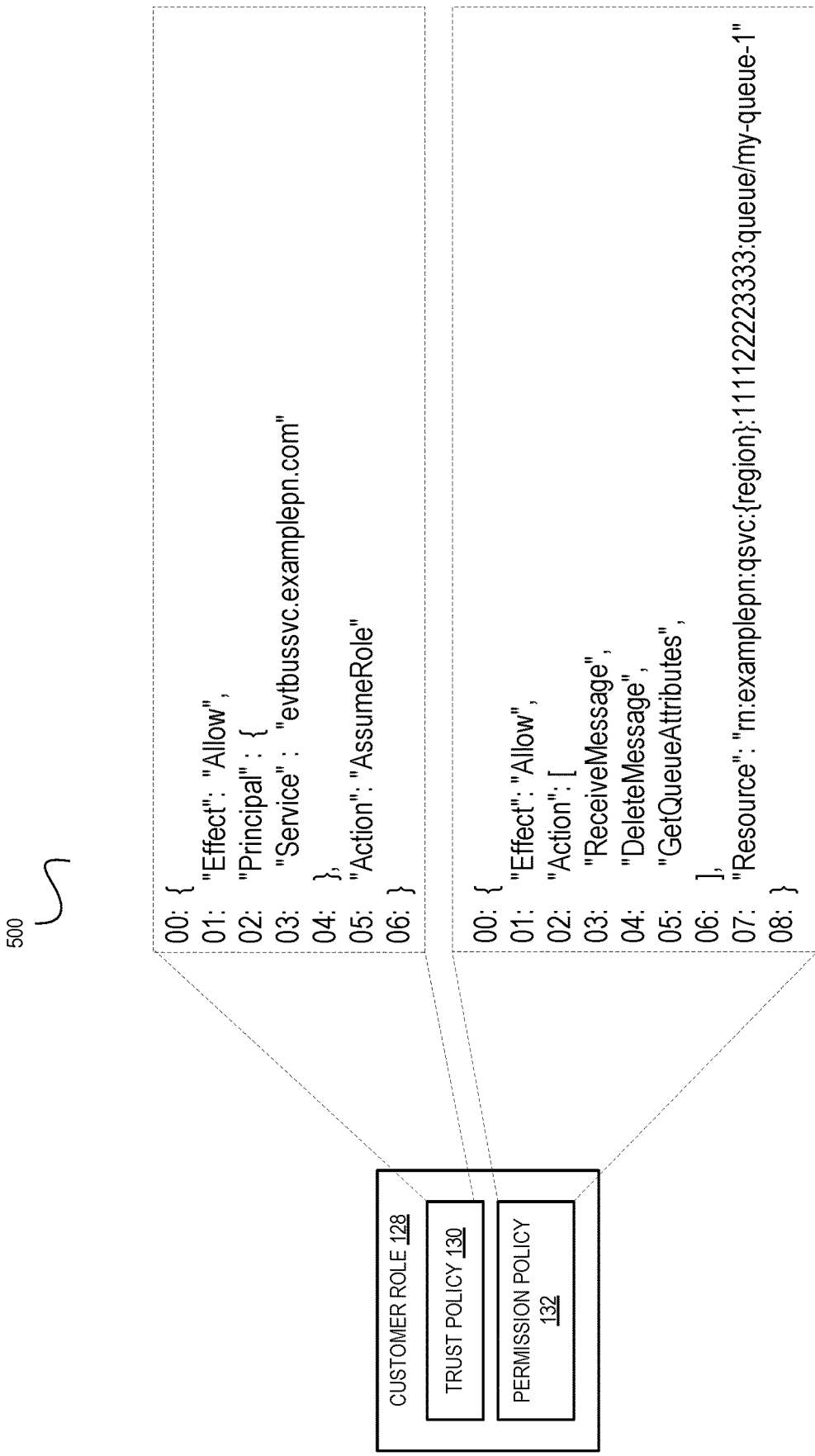
FIG. 6 illustrates an example of a trust policy and a permission policy of a customer role.

FIG. 6 illustrates an example of customer role 128. The trust policy 130 allows (Line 01) the delegating service 104 (here, the event bus service) to assume the customer role 128. The permission policy 132 allows (Line 01) the customer role 128 to perform the set of actions 134 (Lines 02-06) on the customer resource 108 (Line 07). In this example, the customer resource 108 is a message queue and the set of action 134 include reading messages from the message queue, deleting messages from the message queue, and getting attributes of the message queue. Note that the customer role 128 does not grant any permissions to the assuming service 106.

3. Method

As shown in FIG. 1 with circles labeled S1, S2, and S3, one aspect provides a method for role-based permission delegation in the provider network 102. The method includes at step S1 the assuming service 106 sending a request to the temporary credential service 112 to assume the delegation role 120. The method further includes at step S2 the assuming service 106, acting in the delegation role 120, sending a request to the temporary credential service 112 to assume the customer role 114 in accordance with the down scoping policy 136. The method further includes at step S3 the assuming service 106, acting in the customer role 114, performing an action in the strict subset of actions 138 on the customer resource 108.

The method can be performed in system 100 or in any other suitable system.

Figure 7:
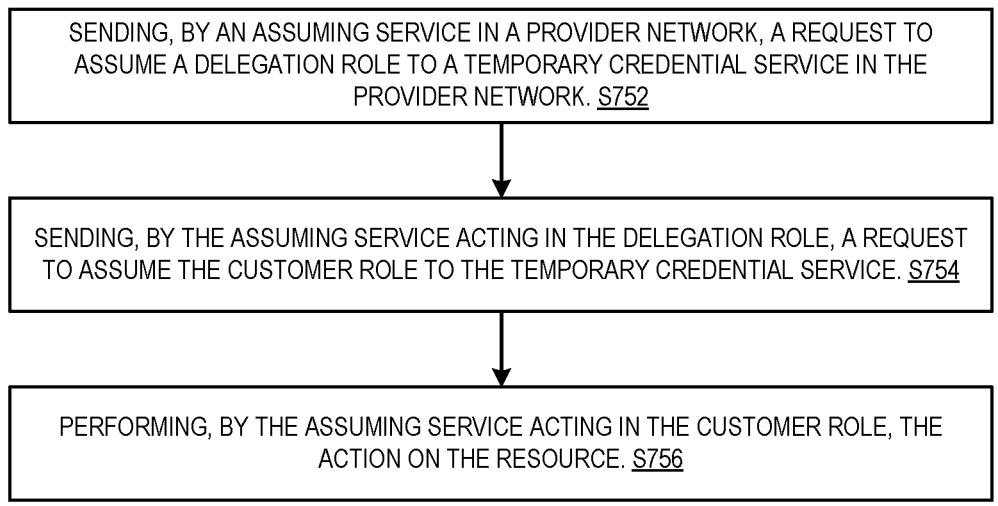
FIG. 7 illustrates an example of a method for role-based permission delegation in a provider network.

Turning to FIG. 7, it illustrates a method for role-based permission delegation in a provider network. Initially, the assuming service 106 operates under the identity of the assuming service account 118. At step S752, the assuming service 106 acting with the identity of the assuming service account 118 sends a request to the temporary credential service 112 to assume the delegation role 120. In doing so, the request specifies a value for the "AssumableCustomerRoleRn" session key. In particular, the assuming service 106 specifies the role principal of the customer role 128 as the value of the "AssumableCustomerRoleRn." The request also specifies the identity of the assuming service account 118 which is a service principal identifying the assuming service 106.

Upon receiving the request to assume the delegation role 120 from the assuming service 106, the temporary credential service 112 evaluates the trust policy 122 of the delegation 120 to determine if the assuming service 106 has permission to assume the delegation role 120. This evaluation includes verifying that the identity of the assuming service account 118 is the identity that, according to the trust policy 122 of the delegation role 120, has permission to assume the delegation 120 (e.g., as in Line 03 of the example trust policy 122 of FIG. 3). The evaluation also includes the temporary credential service 112 verifying the value of the "AssumableCustomerRoleRn" specified by the assuming service 106 in the request matches the pattern of a role principal (e.g., as in Lines 10-12 of FIG. 3). The evaluation also includes the temporary credential service 112 verifying that the value of the "SourceRn" condition session key associated with the request to assume the delegation role 120 matches the pattern of the type of resource that the assuming service 106 is doing work on behalf of (e.g., as in Lines 13-15 of FIG. 3.)

The temporary credential service 112 issues temporary security credentials to the assuming service 106 if the identity of the assuming service 106 is the identity permitted by the trust policy 122 to assume the delegation 120 and if the condition of the trust policy 122 is satisfied with respect to the "AssumableCustomerRoleRn" session key and the "SourceRn" condition session key. If issued, the issued temporary security credentials grants permission to the assuming service 106 to assume a role and to tag a session. These permissions are encoded in the session token of the temporary security credentials that are issued to the assuming service 106.

At step S754, the assuming service 106 acting with the identity of the delegation role 120 sends a request to the temporary credential service 112 to assume the customer role 128. The request includes the session token or other data from the temporary security credentials that represents the permissions granted to the assuming service 106 by successfully assuming the delegation role 120 at step 752. Upon receiving the request to assume the customer role 128, the temporary credential service 112 evaluates the request in view permission policy 124 of delegation role 120. This evaluation includes evaluating condition 126 against the request to assume the customer role 128. The evaluation can serve a number of goals. The first goal is to ensure that the assuming service 106 assumes the delegation role 120 for the purpose of assuming a customer role. The second goal is to ensure that the assuming service 106 assumes the delegation role 120 to facilitate work for the resource type the delegation service 104 wants it to (e.g., confused deputy mitigation). The third goal is to ensure that the assuming service 106 only assumes a role and is not able to escalate privilege within the delegation service 104 by assuming a role in any account in the delegation service 104's service principal. The fourth goal is to ensure that the delegation service 104 down scopes the actions the assuming service 104 can take in the customer account 114. In example trust policy 122 of the delegation role 120 of FIG. 3, the first goal is supported on the trust policy side by the first sub-condition at Lines 10-12 and the second goal is supported by the second sub-condition at Lines 13-15. In the example condition 126 of the permission policy 124 of the delegation role 120 of FIG. 4, the first goal is supported on the permission policy side by the first sub-condition at Lines 08-10. The third goal is supported by the second sub-condition at Lines 11-14. The fourth goal is supported by the third sub-condition at Lines 15-17.

Temporary credential service 112 evaluates the request to assuming the customer role 128 in view of condition 126. Assuming service 106 cannot assume the customer role 128 unless condition 126 is satisfied. If condition 126 is not satisfied, then assuming service 106 cannot assume the customer role 128. Even if condition 126 is satisfied, the permissions granted to the assuming service 106 are limited to those granted in the down scoping policy 136 which are a strict subset 138 of the set of actions 134 granted by the permission policy 132 of the customer role 128 to the delegation role 120. The temporary security credentials returned by the temporary credential service 112 in response to the request to assume the customer role 128 encode the down scoped permissions (e.g., in the session token).

At step S756, the assuming service 106 requests a "target" service to perform a "target" action on the customer resource 108. The target action is an action in the strict subset 138 of actions 134. The request can include the session token or other data from the temporary security credentials returned by the temporary credential service 112 when the assuming service 106 assumed the customer role 128 with down scoped permissions at step S754. The request of the target service encodes the down scoped permissions granted to the assuming service 106 when the assuming service 106 assumed the customer role 128 with down scoped permissions at step S754.

IAM service 110 evaluates the request of the target service in terms of the down scoped permissions. In particular, IAM service 110 does not authorize the request of the target service unless the target action is one in the strict subset 138 of actions 134 as defined by the down scoping policy 136. If the target action is not in the strict subset 138, then the request of the target service is denied. IAM service 110 may allow the request of the target service if the target action is in the strict subset 138 of permitted actions as encoded in the request of the target service (e.g., by a session token).

4. Variations

In a variation, the assuming service 106 assumes the customer role 128 with the down scoped permissions using a single assume role request of the temporary credential service 112 instead of requiring two assume role requests as described above. A design emphasizes a server-side delegation representation to minimize duplication of state managed by the delegating service 104. The design also allows the assuming service 106 to be able to make a single assume role request of the customer role 128. This is accomplished by a new IAM service 110 entity termed "DelegationRelationship."

DelegationRelationship is a combination of delegating service 104 service principal, assuming service 106 service principal, down scoping policy 136 listing the permissions being delegated, and a public resource type that the delegation is for. The pair of delegation service 104 and assuming service 106 can have multiple DelegationRelationships for different delegation scenarios (e.g., with different down scoping policies or public resource types that the delegation is for).

The assuming service 106 references a DelegationRelationship when making the request of the temporary credential service 112 to assume the customer role 128. The temporary credential service 112 validates that the DelegationRelationship is applicable to the calling service and customer role trust relationship, that the target role account is not in the service principal of either of the delegating service 104 or assuming service 106 service principals, and the "SourceRn" condition session key matches the resource type of the DelegationRelationship. The temporary credential service 112 then applies the delegation service 104 identity, and assume the customer role 128 with the scoping policy 136. Note that the first goal discussed above is still met implicitly by assuming the customer role 128 via a DelegationRelationship. The first and fourth goals are met by server-side validation. The third goal is met via the applied scoping policy 136.

In an extension of the above variation, the concept of an "AuthenticationCode" is added to the "DelegationRelationship" approach. An AuthenticationCode is created by the delegation service 104 when it wants to delegate work in an untrusted environment scope to only a single customer role 128. Creating one requires the customer role 128 and a DelegationRelationship (and optionally an expiry time), which returns an encrypted and signed representation of the parameters. The DelegationRelationship itself has a new property indicating whether an AuthenticationCode is required to use it. The delegation service 104 passes the created AuthenticationCode together with the customer role 128 and the DelegationRelationship to the assuming service 106. The assuming service 106 provides all three to the temporary credential service 112. The temporary credential service 112 validates the signature, decrypts the AuthenticationCode, validates that the contents match the parameters, checks the expiry, and completes the customer role 128 assumption. The fully encrypted representation of an AuthenticationCode requires no additional state in the temporary credential service 112. The expiry can be optional, and revocation is expected to be a rare operational event. So revocation lists can be modelled as an attribute on the DelegationRelationship entity itself.

Figure 8:
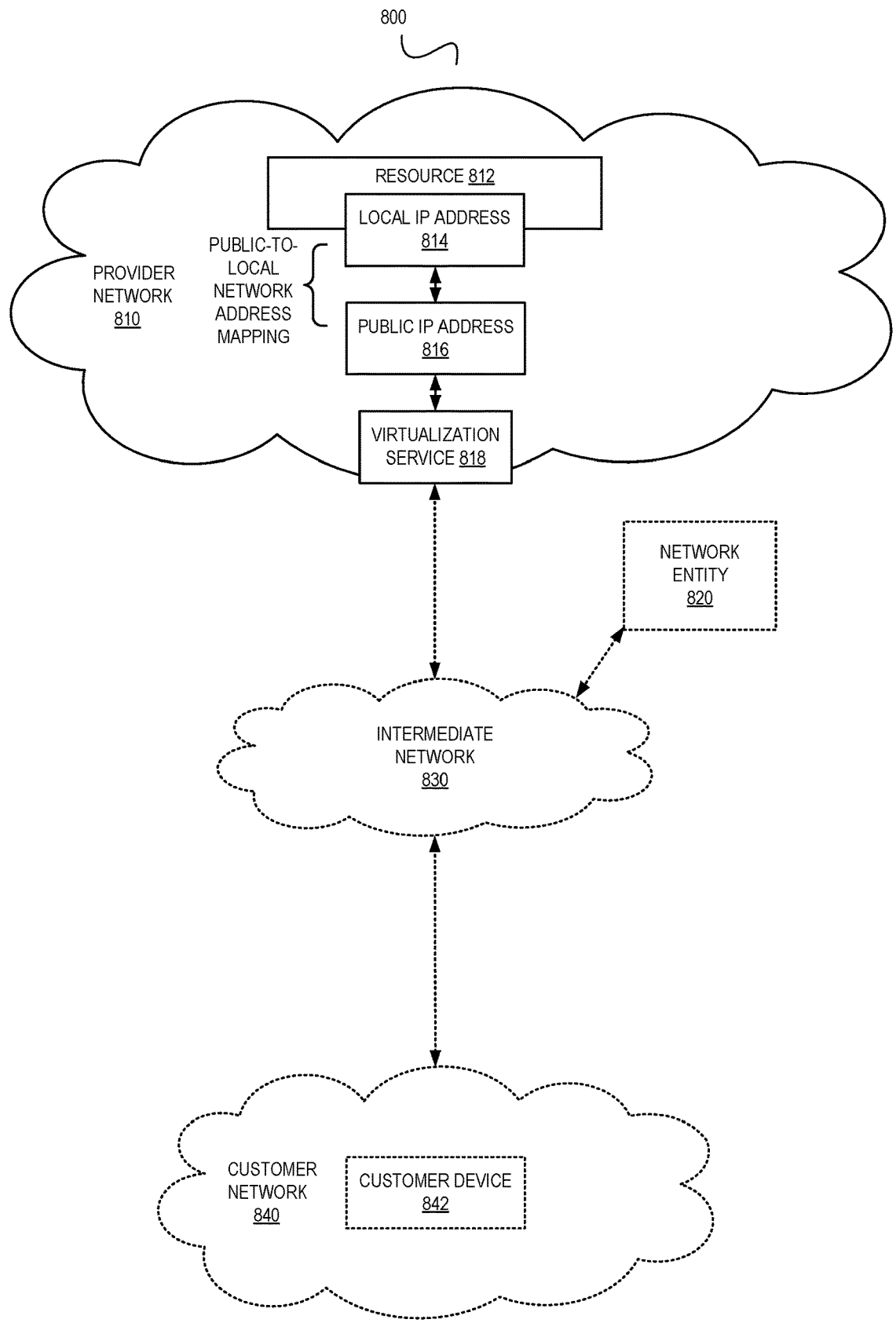
FIG. 8 illustrates a provider network environment in which the techniques disclosed herein can be implemented.

FIG. 8 illustrates a provider network environment 800 in which the techniques disclosed herein can be implemented. The environment 800 includes a provider network 810 and optionally an intermediate network 830 and a customer network 840. While the intermediate network 830 and the customer network 840 are depicted in FIG. 8 as being external to the provider network 810, the intermediate network 830 and the customer network 840 can alternatively be internal to (within) the provider network 810. The provider network 810 provides resource virtualization to a customer of the provider network 810 via a virtualization service 818. The virtualization service 818 allows the customer to purchase, rent, subscribe to, or otherwise obtain use of one or more resources (e.g., resource 812).

The resource 812 can be a compute, storage, or network resource. The resource 812 can be implemented by an electronic device in a datacenter within the provider network 810. The datacenter can be a physical facility or building that houses compute, storage, and network infrastructure. The provider network 810 can encompass many resources implemented by many electronic devices distributed over a set of datacenters located in different geographic regions or locations. An example of an electronic device is device 900 described below with respect to FIG. 9.

The resource 812 can be a virtual machine (VM) or a container. A virtual machine is a compute resource that uses software instead of a physical computer to run a program and deploy an application. A virtual machine (sometimes called a "guest machine") can run on a single physical machine (sometimes called the "host machine"). A virtual machine can execute its own operating system (e.g., UNIX, WINDOWS, LINUX, etc.) and can function separately at least in part from other virtual machines, including those on the same host machine. A virtual machine can be a substitute for a physical machine. A host machine's physical resources can be shared between multiple virtual machines each running its own copy of an operating system. Access to and use of the host machine's physical resources (e.g., hardware processor and physical memory resources) by the multiple virtual machines can be coordinated by a virtual machine monitor (sometimes called a "hypervisor"). The hypervisor itself can run on the bare hardware of the host machine or as a process of an operating system that runs on the bare hardware.

A container is like a virtual machine with respect to running separate applications on a single platform. However, a container typically encapsulates a single application or a set of one or more related applications along with runtime dependencies and libraries, while a virtual machine virtualizes the hardware to create a "computer." Another difference is that a container system typically provides the services of an operating system kernel that runs on the bare hardware of the underlying host machine to containers that share the kernel services as orchestrated by the container system. The container system itself can run on the host machine with the aid of the operating system kernel and can isolate the containers from each other to a certain degree. While a container can be used independently of a virtual machine, a container and a virtual machine can be used together. For example, a container can run on an operating system that runs on a virtual machine that runs on a host machine.

Within the provider network 810 a local Internet Protocol (IP) address 814 is associated with the resource 812. The local IP address 814 includes an internal or private network address in the provider network 810. The local IP address 814 can be an IPv4 or IPv6 address, for example. For example, the local IP address 814 can be one reserved by Internet Engineering Task Force (IETF) Request for Comments (RFC) 1918 or having an address format specified by IETF RFC 4193 and can be mutable within the provider network 810.

Network traffic originating from a network entity 820 coupled to the intermediate network 830 or from a customer device 842 in the customer network 840 that is destined for the resource 812 in the provider network 810 typically is not directly routed to the local IP address 814. Instead, the network traffic is addressed to a public IP address 816. The public IP address 816 can be mapped within the provider network 810 to the local IP address 814 using network address translation (NAT) or similar technology.

Using the customer device 842 in the customer network 840, the customer uses, controls, operates, or benefits from the virtualization service 818, the resource 812, the local IP address 814, and the public IP address 816 to implement a customer-specific application and offer the application to one or more network entities (e.g., network entity 820) on the intermediate network 830. The network entity 820 can generate network traffic destined for the application by addressing the network traffic for the public IP address 816. The traffic can be routed via the intermediate network 830 to the datacenter of the provider network 810 which houses the electronic device that implements the resource 812. Within the data center, the traffic can be routed to the local IP address 814 where the traffic is received and processed by the resource 812. Response network traffic from the resource 812 can be routed back onto the intermediate network 830 to the network entity 820.

Figure 9:
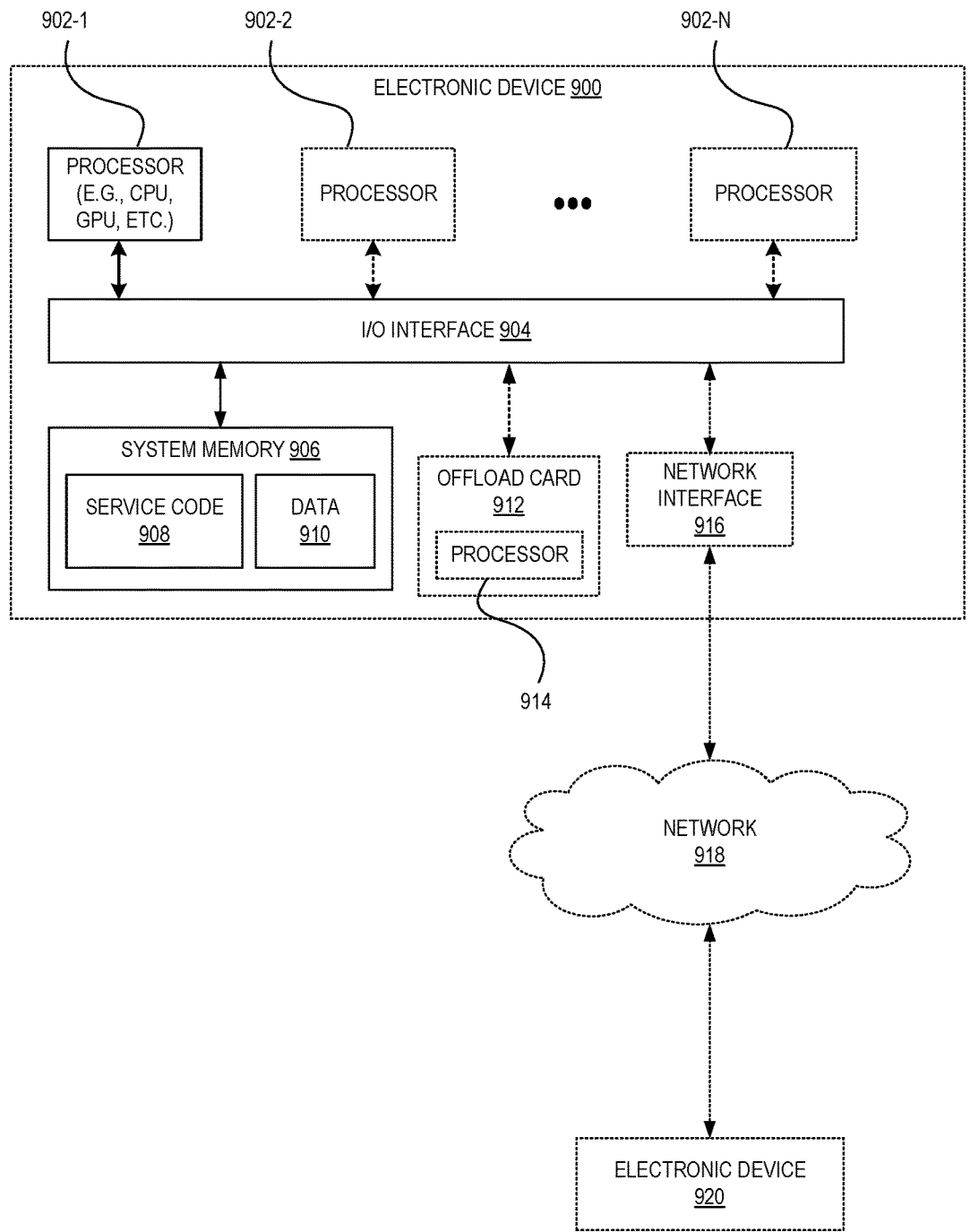
FIG. 9 illustrates an electronic device that can be used in an implementation of the techniques disclosed herein.

FIG. 9 illustrates an electronic device 900 that can be used in an implementation of the techniques disclosed herein. Device 900 includes a set of one or more processors 902-1, 902-2, ..., 902-N coupled to system memory 906 via an input/output (I/O) interface 904. The device 900 can further include a network interface 916 coupled to the I/O interface 904.

The device 900 can be a uniprocessor system including one processor or can be a multiprocessor system including multiple processors. Each of processors 902-1, 902-2, ..., 902-N can be any suitable processor capable of executing instructions. For example, each of the processors 902-1, 902-2, ..., 902-N can be general-purpose or embedded processor implementing any of a variety of instruction set architectures (ISAs), such as the X86, ARM, POWERPC, SPARC, or MIPS ISAs, or any other suitable ISA.

The system memory 906 stores instructions and data accessible by the processor(s) 902-1, 902-2, ..., 902-N. The system memory 906 is implemented using any suitable memory technology, such as random-access memory (RAM), static RAM (SRAM), synchronous dynamic RAM (SDRAM), nonvolatile or Flash-type memory, or any other type of memory. Program instructions 908 and data 910 implementing a desired function, such as a method, process, act, or operation of the techniques disclosed herein, are stored within the system memory 906 as code 908 (e.g., executable to implement, in whole or in part, a method, process, act, or operation performed by assuming service 106 or temporary credential service 112) and data 910.

The I/O interface 904 is configured to coordinate I/O traffic between the processor(s) 902-1, 902-2, ..., 902-N, the system memory 906, and any peripheral devices in device 900, including, optionally, a network interface 916 or other peripheral interfaces (not shown). The I/O interface 904 performs any necessary protocol, timing, or other data transformations to convert data signals from one component (e.g., the system memory 906) into a format suitable for use by another component (e.g., the processor(s) 902-1, 902-2, ..., 902-N).

The I/O interface 904 can include support for devices attached through various types of peripheral buses, such as a variant of the PERIPHERAL COMPONENT INTERCONNECT (PCI) bus standard or the UNIVERSAL SERIAL BUS (USB) standard, for example (e.g., a bus implementing a version of the PERIPHERAL COMPONENT INTERCONNECT—EXPRESS (PCI-E) standard, or another interconnect such as a QUICKPATH INTERCONNECT (QPI) or ULTRAPATH INTERCONNECT (UPI)). The function of the I/O interface 904 can be split into two or more separate components, such as a north bridge and a south bridge, for example. Also, some of the functionality of the I/O interface 904, such as an interface to the system memory 906, can be incorporated directly into the processor(s) 902-1, 902-2, ..., 902-N.

An optional network interface 916 is configured to allow data to be exchanged between device 900 and another electronic device 920 attached to device 900 via a network 918. The network interface 916 supports communication via any suitable wired or wireless networks, such as a type of wired or wireless Ethernet network, for example. Additionally, the network interface 916 can support communication via telecommunications or telephony networks, such as analog voice networks or digital fiber communications networks, via storage area networks (SANs), such as FIBRE CHANNEL SANs, or via any other suitable type of network or protocol.

The device 900 optionally includes an offload card 912 including a processor 914, and possibly including a network interface (not depicted), that is connected using the I/O interface 904. For example, device 900 can act as a host electronic device (e.g., operating as part of a hardware virtualization service) that hosts compute resources such as compute instances, and the offload card 912 can execute a virtualization manager that can manage compute instances that execute on the host electronic device 900. As an example, the offload card 912 can perform compute instance management operations, such as pausing or un-pausing compute instances, launching or terminating compute instances, performing memory transfer/copying operations, etc. These management operations can be performed by the offload card in coordination with a hypervisor (e.g., upon a request from a hypervisor) that is executed by the processor(s) 902-1, 902-2, ..., 902-N of device 900. However, the virtualization manager implemented by the offload card 912 can accommodate requests from other entities (e.g., from compute instances themselves).

The system memory 906 encompasses one or more computer-accessible media configured to store program instructions 908 and data 910. However, program instructions 908 or data 910 can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in all cases to cause the performance of A, and A may be performed in some cases without being caused by the performance of B. In those cases, however, A would not be based on B even though A is based on B in other cases. Further, unless the context clearly indicates otherwise, the term "A based on B" is not intended to require that the performance of B by itself be sufficient in all cases to cause the performance of A, and one or more other steps, acts, or operations in addition to B may be performed in some cases to cause the performance of A. In such circumstances, A can still be based on B even though multiple steps, acts, or operations including B are performed to cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

It will be clear to one skilled in the art that the above embodiments may be altered in many ways without departing from the scope of the invention. Accordingly, the scope of the invention should be determined by the following claims and their legal equivalents.

What is claimed is:

1. A method for role-based permission delegation in a provider network, the method comprising:
    delegating, to an assuming service in the provider network, permission to assume a delegation role, wherein the permission is granted by a customer to a delegating service in the provider network, and wherein the assuming service and the delegating service are discrete units of software or hardware functionality provided by the provider network that can be accessed remotely and acted upon and updated independently of one another;
    sending, by the assuming service to a temporary credential service in the provider network, a request to assume the delegation role, the delegation role comprising a permission policy, the permission policy of the delegation role allowing assumption by the assuming service of a customer role under a condition, the customer role comprising a permission policy, the permission policy of the customer role allowing a set of actions on a customer resource, the condition requiring the customer role to be assumed with permission to perform a strict subset of the set of actions on the customer resource, wherein the strict subset of the set of actions is less than all the actions in the set of actions;
    sending, by the assuming service acting in the delegation role to the temporary credential service, a request to assume the customer role, the request to assume the customer role requesting permission to perform the strict subset of the set of actions on the customer resource; and
    performing, by the assuming service acting in the customer role with permission to perform the strict subset of the set of actions on the customer resource, a particular action in the strict subset of the set of actions on the customer resource.

2. The method of claim 1, further comprising:
    receiving, by the temporary credential service, the request to assume the delegation role;
    evaluating, by the temporary credential service, a trust policy of the delegation role against the request to assume the delegation role;
    sending, by the temporary credential service, temporary security credentials for acting in the delegation role;
    receiving, by the temporary credential service, the request to assume the customer role;
    evaluating, by the temporary credential service, the condition against the request to assume the customer role; and
    sending, by the temporary credential service, temporary security credentials for acting in the customer role with permission to perform the strict subset of the set of actions on the customer resource.

3. The method of claim 1, wherein performing, by the assuming service acting in the customer role, the action on the customer resource comprises sending, by the assuming service acting in the customer role with permission to perform the strict subset of the set of actions on the customer resource, a request to a service in the provider network to perform the particular action on the customer resource.

4. A method for role-based permission delegation in a provider network, the method comprising:
    delegating, to a first service in the provider network, permission to assume a first role, wherein the permission is granted by a customer to a second service in the provider network, and wherein the first service and the second service are discrete units of software or hardware functionality provided by the provider network that can be accessed remotely and acted upon and updated independently of one another;
    sending, by the first service, a request to assume the first role, the first role comprising a first permission policy, the first permission policy of the first role allowing assumption by the first service of a second role under a condition, the second role comprising a second permission policy, the second permission policy of the second role allowing a set of actions on a resource, the condition requiring the second role to be assumed with permission to perform a strict subset of the set of actions on the resource, wherein the strict subset of the set of actions is less than all the actions in the set of actions;
    sending, by the first service acting in the first role, a request to assume the second role, the request to assume the second role requesting permission to perform the strict subset of the set of actions on the resource; and
    performing, by the first service acting in the second role with permission to perform the strict subset of the set of actions on the resource, a particular action in the strict subset of the set of actions on the resource.

5. The method of claim 4, further comprising:
receiving the request to assume the first role;
evaluating a trust policy of the first role against the request to assume the first role;
sending temporary security credentials for acting in the first role;
receiving the request to assume the second role;
evaluating the condition against the request to assume the second role; and
sending temporary security credentials for acting in the second role with permission to perform the strict subset of the set of actions on the resource.

6. The method of claim 4, wherein performing, by the first service acting in the second role with permission to perform the strict subset of the set of actions on the resource, the particular action on the resource comprises sending, by the first service acting in the second role with permission to perform the strict subset of the set of actions on the resource, a request to a service in the provider network to perform the particular action on the resource.

7. The method of claim 4, further comprising:
sending the request to assume the first role with a session key having a value specifying an identifier of the second role; and
allowing the first service to assume the first role based on verifying that the value specifying the identifier of the second role satisfies a string pattern matching expression of a trust policy of the first role, the string pattern matching expression matching a string value having a service principal form.

8. The method of claim 4, further comprising allowing the first service to assume the first role based on verifying that a value of a session key associated with the request to assume the first role satisfies a string pattern matching expression of a trust policy of the first role, the value of the session key identifying a resource of a service in the provider network making the request to assume the first role, the value of the session key specifying a particular type of resource, the string pattern matching expression matching a string value having a resource principal form, the resource principal form requiring the particular type of resource.

9. The method of claim 4, further comprising:
sending the request to assume the first role with a first session key having a value specifying an identifier of the second role;
allowing the first service to assume the first role based on verifying that the value specifying the identifier of the second role satisfies a string pattern matching expression of a trust policy of the first role, the string pattern matching expression matching a string value having a service principal form;
allowing the first service to assume the second role based on verifying that a value of a second session key associated with the request to assume the second role satisfies a sub-condition of the condition, the sub-condition of the condition requiring the value of the second session key to match the value of the first session key.

10. The method of claim 4, further comprising allowing the first service to assume the second role based on verifying that a value of a session key associated with the request to assume the second role satisfies a sub-condition of the condition, the sub-condition of the condition requiring the value of the session key to not match a service principal specified by the sub-condition.

11. The method of claim 4, further comprising allowing the first service to assume the second role based on verifying that a value of a session key associated with the request to assume the second role satisfies a sub-condition of the condition, the sub-condition of the condition requiring the value of the session key to not match an account identifier specified by the sub-condition.

12. The method of claim 4, further comprising allowing the first service to assume the second role based on verifying that a value of a session key associated with the request to assume the second role satisfies a sub-condition of the condition, the sub-condition of the condition requiring the value of the session key to match an identifier of a down scoping policy specified by the sub-condition.

13. The method of claim 4, further comprising allowing the first service to assume the second role with permission to perform the strict subset of the set of actions on the resource including sending, to the first service, temporary security credentials encoding that an assuming service has permission to perform the strict subset of the set of actions on the resource.

14. The method of claim 4, wherein the first service is an on-demand code execution service in the provider network, wherein the resource is a message queue, and wherein the particular action is polling the message queue for new messages.

15. A system comprising:
a first one or more electronic devices to implement an assuming service in a provider network, the assuming service comprising instructions which when executed cause the assuming service to:
be delegated permission to assume a delegation role, wherein the permission is granted by a customer to a delegating service in the provider network, and wherein the assuming service and the delegating service are discrete units of software or hardware functionality provided by the provider network that can be accessed remotely and acted upon and updated independently of one another;
send a request to assume the delegation role, the delegation role comprising a permission policy, the permission policy of the delegation role allowing assumption by the assuming service of a customer role under a condition, the customer role comprising a permission policy, the permission policy of the customer role allowing a set of actions on a customer resource, the condition requiring the customer role to be assumed with permission to perform a strict subset of the set of actions on the customer resource, wherein the strict subset of the set of actions is less than all the actions in the set of actions;
send a request to assume the customer role, the request to assume the customer role requesting permission to perform the strict subset of the set of actions on the customer resource; and
perform a particular action in the strict subset of the set of actions on the resource;
a second one or more electronic devices to implement a temporary credential service in the provider network, the temporary credential service having instructions which when executed cause the temporary credential service to:
receive the request to assume the delegation role;
send temporary security credentials for acting in the delegation role;
receive the request to assume the customer role; and
send temporary security credentials for acting in the customer role with permission to perform the strict subset of the set of actions on the customer resource.

16. The system of claim 15, the temporary credential service comprising instructions which when executed cause the temporary credential service to:

evaluate a trust policy of the delegation role against the request to assume the delegation role; and evaluate the condition against the request to assume the customer role.

17. The system of claim 15, wherein the instructions configured to perform the particular action on the customer resource in the strict subset of the set of actions comprises instructions which when executed by the assuming service further cause the assuming service to send a request to a service in the provider network to perform the particular action on the customer resource.

18. The system of claim 15, the temporary credential service comprising further instructions which when executed further cause the temporary credential service to allow the assuming service to assume the second role based on verifying that a value of a session key associated with the request to assume the customer role satisfies a sub-condition of the condition, the sub-condition of the condition requiring the value of the session key to match an identifier of a down scoping policy specified by the sub-condition.

19. The system of claim 15, the temporary credential service comprising further instructions which when executed further cause the temporary credential service to allow the assuming service to assume the customer role based on verifying that a value of a session key associated with the request to assume the customer role satisfies a sub-condition of the condition, the sub-condition of the condition requiring the value of the session key to not match an account identifier specified by the sub-condition.

20. The system of claim 15, the temporary credential service comprising further instructions which when executed further cause the temporary credential service to allowing the assuming service to assume the customer role based on verifying that a value of a session key associated with the request to assume the customer role satisfies a sub-condition of the condition, the sub-condition of the condition requiring the value of the session key to not match a service principal specified by the sub-condition.

\* \* \* \* \*